US012429959B2

(12) United States Patent
Yamauchi et al.

(10) Patent No.: US 12,429,959 B2
(45) Date of Patent: Sep. 30, 2025

(54) INFORMATION PROCESSING APPARATUS AND DEVICE POSITION ACQUISITION METHOD

(71) Applicant: Sony Interactive Entertainment Inc., Tokyo (JP)

(72) Inventors: Koki Yamauchi, Tokyo (JP); Takanori Minamino, Tokyo (JP); Kenzo Nishikawa, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 18/414,495

(22) Filed: Jan. 17, 2024

(65) Prior Publication Data

US 2024/0256056 A1 Aug. 1, 2024

(30) Foreign Application Priority Data

Jan. 27, 2023 (JP) ................. 2023-011323

(51) Int. Cl.
| | |
|---|---|
| *G06F 3/03* | (2006.01) |
| *G06F 3/01* | (2006.01) |
| *G06F 3/0346* | (2013.01) |
| *G06T 7/73* | (2017.01) |
| *A63F 13/211* | (2014.01) |
| *A63F 13/213* | (2014.01) |

(52) U.S. Cl.
CPC ............ *G06F 3/0346* (2013.01); *G06F 3/012* (2013.01); *G06F 3/014* (2013.01); *G06T 7/75* (2017.01); *A63F 13/211* (2014.09); *A63F 13/213* (2014.09); *G06T 2207/30204* (2013.01)

(58) Field of Classification Search
CPC ........ G06F 3/0346; G06F 3/012; G06F 3/014; G06T 7/75
See application file for complete search history.

(56) References Cited

U.S. PATENT DOCUMENTS

| | | | | |
|---|---|---|---|---|
| 2020/0342621 | A1* | 10/2020 | Nishikawa | ............. G06V 40/28 |
| 2020/0342624 | A1* | 10/2020 | Nishikawa | ................ G06T 7/66 |
| 2022/0161127 | A1* | 5/2022 | Nishikawa | ............ A63F 13/212 |

FOREIGN PATENT DOCUMENTS

| | | |
|---|---|---|
| JP | 2020-181322 A | 11/2020 |
| WO | 2021/240930 A1 | 12/2021 |

* cited by examiner

*Primary Examiner* — Roy P Rabindranath
(74) *Attorney, Agent, or Firm* — Kilpatrick Townsend & Stockton LLP

(57) ABSTRACT

Disclosed herein is an information processing apparatus including a first device information acquisition section that acquires position and posture information relating to a first device worn on a user, a second device information acquisition section that acquires position information relating to a second device worn on a portion different from the first device on the basis of the position and posture information relating to the first device and a skeleton model of a human, and a sensor data acquisition section that acquires sensor data from a sensor that measures motions of the first device and the second device. The second device information acquisition section changes a degree of following of the skeleton model to the first device on a basis of the sensor data.

20 Claims, 16 Drawing Sheets

14

INFORMATION PROCESSING APPARATUS AND DEVICE POSITION ACQUISITION METHOD

CROSS-REFERENCE TO RELATED APPLICATION

This application claims the benefit of Japanese Priority Patent Application JP 2023-011323 filed Jan. 27, 2023, the entire contents of which are incorporated herein by reference.

BACKGROUND

The present disclosure relates to an information processing apparatus and a device position acquisition method which acquire position information relating to a device such as a controller.

In Japanese Patent Laid-open No. 2020-181322 (Patent Document 1), there is disclosed an information processing apparatus which identifies representative coordinates of a marker image from an image acquired by capturing a device provided with a plurality of markers and uses the representative coordinates of the marker image to derive position information and posture information relating to the device. The information processing apparatus disclosed in Patent Document 1 identifies a first boundary box surrounding a region in which pixels having luminance equal to or higher than first luminance are continuous to each other in the captured image, identifies a second boundary box surrounding a region in which pixels having luminance equal to or higher than second luminance higher than the first luminance in the first boundary box are continuous to each other in the captured image, and derives the representative coordinates of the marker image on the basis of the pixels in the first boundary box or the second boundary box.

In WO2021/240930A (Patent Document 2), there is disclosed an input device provided with a plurality of light emission sections and a plurality of operation members. The light emission sections of the input device are imaged by a camera provided to a head-mounting device, and a position and a posture of the input device are calculated on the basis of the detected positions of the light emission sections.

SUMMARY

In recent years, an information processing technology of tracking a position and a posture of a device and reflecting the position and the posture to a three-dimensional (3D) model in a virtual reality (VR) space has become popular. An intuitive operation by a user is achieved by causing a motion of a play character or a game object in a game space to cooperate with changes in the position and the posture of the device to be tracked.

The device position estimation processing disclosed in Patent Document 1 is executed when the device is captured by the imaging apparatus and the marker images are included in the captured image. As a result, the device position estimation processing disclosed in Patent Document 1 cannot be executed when the device moves out from an angle of view of the imaging apparatus and the marker images are consequently no longer included in the captured image.

In view of this, it is desirable for the present disclosure to provide a technology capable of continuously acquiring position information relating to a device regardless of a position of the device. Note that the device may be an input device including an operation member and may be a device which does not include an operation member and is to simply be tracked.

According to an embodiment of the present disclosure, there is provided an information processing apparatus. This information processing apparatus includes a first device information acquisition section that acquires position and posture information relating to a first device worn on a user, a second device information acquisition section that acquires position information relating to a second device worn on a portion different from the first device on the basis of the position and posture information relating to the first device and a skeleton model of a human, and a sensor data acquisition section that acquires sensor data from a sensor that measures motions of the first device and the second device, and the second device information acquisition section changes a degree of following of the skeleton model to the first device on the basis of the sensor data.

In this configuration, "wearing" means a directly or indirectly substantially fixed state to the human body and includes a case of holding by the user himself or herself in addition to a case of attachment or wearing through a certain fixing mechanism.

According to another embodiment of the present disclosure, there is provided a device position estimation method. This device position estimation method includes acquiring position and posture information relating to a first device worn on a user, acquiring position information relating to a second device worn on a portion different from the first device on the basis of the position and posture information relating to the first device and a skeleton model of a human, and acquiring sensor data from a sensor that measures motions of the first device and the second device, in which the acquiring the position information relating to the second device changes a degree of following of the skeleton model to the first device on the basis of the sensor data.

Note that any combination of the foregoing components and any conversion of the expressions of embodiments of the present disclosure from/to methods, devices, systems, computer programs, recording media having recorded thereon computer programs in a readable manner, data structures, and the like are also effective as the embodiments of the present disclosure.

According to an embodiment of the present disclosure, the position information relating to the device can continuously be acquired regardless of the position of the device.

DETAILED DESCRIPTION OF THE PREFERRED EMBODIMENT

Figure 1:
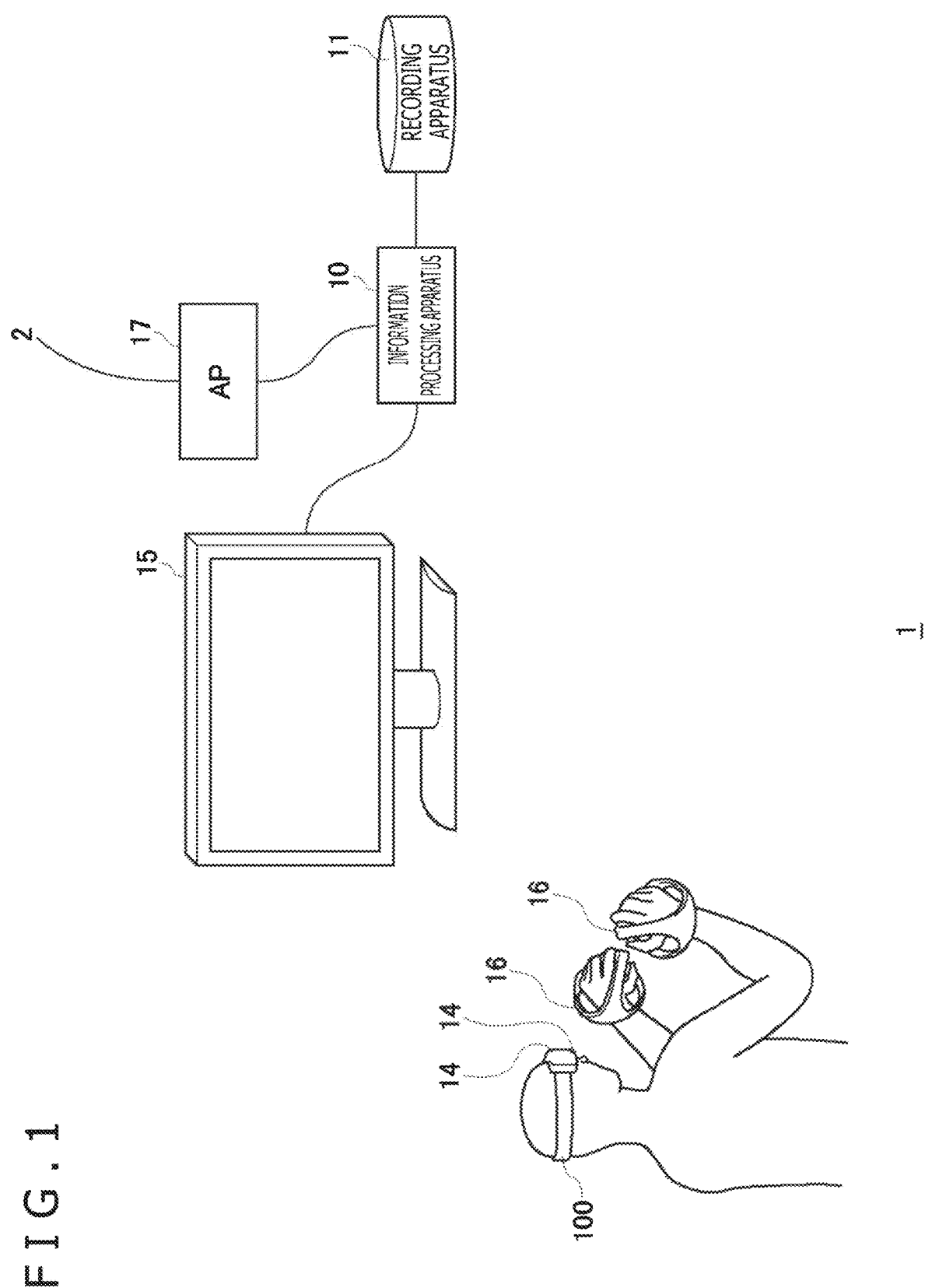
FIG. 1 is a view for illustrating a configuration example of an information processing system in the present embodiment.

FIG. 1 illustrates a configuration example of an information processing system 1 in the present embodiment. The information processing system 1 includes an information processing apparatus 10, a recording apparatus 11, a head-mounted display (HMD) 100, input devices 16 which are held by a user and are operated by the fingers, and an output apparatus 15 which outputs an image and sounds. The output apparatus 15 may be a television set. The information processing apparatus 10 is connected to an external network 2 such as the Internet via an access point (AP) 17. The AP 17 has functions of a wireless access point and a router, and the information processing apparatus 10 may be connected to the AP 17 via a cable or may be connected thereto through a known wireless communication protocol.

The recording apparatus 11 records system software and applications such as game software. The information processing apparatus 10 may download the game software from a content server to the recording apparatus 11 via the network 2. The information processing apparatus 10 executes the game software to supply image data and sound data relating to a game to the HMD 100. The information processing apparatus 10 and the HMD 100 may be connected to each other through a known wireless communication protocol or may be connected via a cable.

The HMD 100 is a display device which is worn by the user on a head portion to display images on display panels positioned in front of the eyes of the user. The HMD 100 individually displays an image for the left eye on a display panel for left eye and an image for the right eye for a display panel for right eye, respectively. These images form parallax images viewed from the left and right viewpoints, thereby achieving the stereoscopy. The user views the display panels via optical lenses, and hence, the information processing apparatus 10 provides the parallax image data for which optical distortion by the lenses is corrected to the HMD 100.

The output apparatus 15 is not necessary for the user wearing the HMD 100, but another user can view the display image on the output apparatus 15 by preparing the output apparatus 15. The information processing apparatus 10 may cause the same image as the image viewed by the user wearing the HMD 100 to be displayed on the output apparatus 15, but may cause another image to be displayed. For example, when the user wearing the HMD and another user play the game together, a game image from a character viewpoint of the other user may be displayed on the output apparatus 15.

The information processing apparatus 10 and the input devices 16 may be connected to each other through a known wireless communication protocol or may be connected to each other via cables. The input device 16 includes a plurality of operation members such as operation buttons, and the user operates the operation members by the fingers while gripping the input device 16. The input device 16 is used as a game controller when the information processing apparatus 10 executes the game. The input device 16 is provided with an inertial measurement unit (IMU) including a three-axis acceleration sensor and a three-axis angular velocity sensor and transmits sensor data at a predetermined cycle (for example, 800 Hz) to the information processing apparatus 10.

The game in the present embodiment treats not only operation information relating to operation members of the input devices 16, but also positions, speeds, postures, and the like of the input devices 16 as the operation information, thereby reflecting the operation information to a motion of the play character in a virtual three-dimensional space. For example, the operation information relating to the operation members may be used as information for moving the play character and the operation information relating to the position, the speed, the posture, and the like of the input device 16 may be used as information for moving an arm of the play character. The motion of the input device 16 in a battle scene in the game is reflected to a motion of the play character carrying a weapon, thereby realizing an intuitive operation of the user, resulting in an increase in immersion into the game.

A plurality of markers (light emission sections) which can be captured by an imaging apparatus 14 are provided to each input device 16 in order to track the position and the posture of the input device 16. The information processing apparatus 10 has a function (hereinafter also referred to as a "first estimation function") of analyzing the image acquired by capturing the input device 16, thereby estimating the position and the posture of the input device 16 in the real world.

A plurality of the imaging apparatuses 14 are mounted to the HMD 100. The plurality of imaging apparatuses 14 are mounted to different positions in different postures on a front surface of the HMD 100 such that an entire imaging range obtained by adding imaging ranges thereof includes an entire view field of the user. The imaging apparatus 14 includes an image sensor capable of acquiring images of the plurality of markers of the input devices 16. For example, when the marker emits visible light, the imaging apparatus 14 includes a visible light sensor such as a charge coupled device (CCD) sensor or a complementary metal oxide semiconductor (CMOS) sensor used for a general digital video camera. When the marker emits invisible light, the imaging apparatus 14 includes an invisible light sensor. The plurality of imaging apparatuses 14 capture the views in front of the user at a synchronized timing and at a predetermined cycle (for example, 120 frames/second) and transmit image data acquired by capturing the real space to the information processing apparatus 10.

The information processing apparatus 10 executes the first estimation function to identify positions of the plurality of marker images of the input device 16 included in the captured image. Note that there is a case in which one input device 16 is captured by a plurality of imaging apparatuses 14 at the same timing, but the mounting positions and the mounting postures of the imaging apparatuses 14 are known, and hence the information processing apparatus 10 may combine the plurality of captured images to identify the positions of the marker images.

A three-dimensional shape of the input device 16 and position coordinates of the plurality of markers arranged on the surface thereof are known, and the information processing apparatus 10 estimates the position and the posture of the input device 16 in the real space on the basis of the position coordinates of the plurality of marker images within the captured image. The position of the input device 16 is estimated as coordinate values in world coordinates in a three-dimensional space having a reference position as an origin, and the reference position may be position coordinates (latitude, longitude, and height (elevation)) set before a start of the game.

The information processing apparatus 10 of the present embodiment has a function (hereinafter also referred to as a "second estimation function") of analyzing the sensor data transmitted from the input device 16, thereby estimating the position and the posture of the input device 16 in the real world. The information processing apparatus 10 uses an estimation result through the first estimation function and an estimation result through the second estimation function to derive the position and the posture of the input device 16. The information processing apparatus 10 of the present embodiment uses a state estimation technology through use of the Kalman filter to unify the estimation result of the first estimation function and the estimation result of the second estimation function, thereby highly accurately estimating the state of the input device 16 at the current time.

Figure 2:
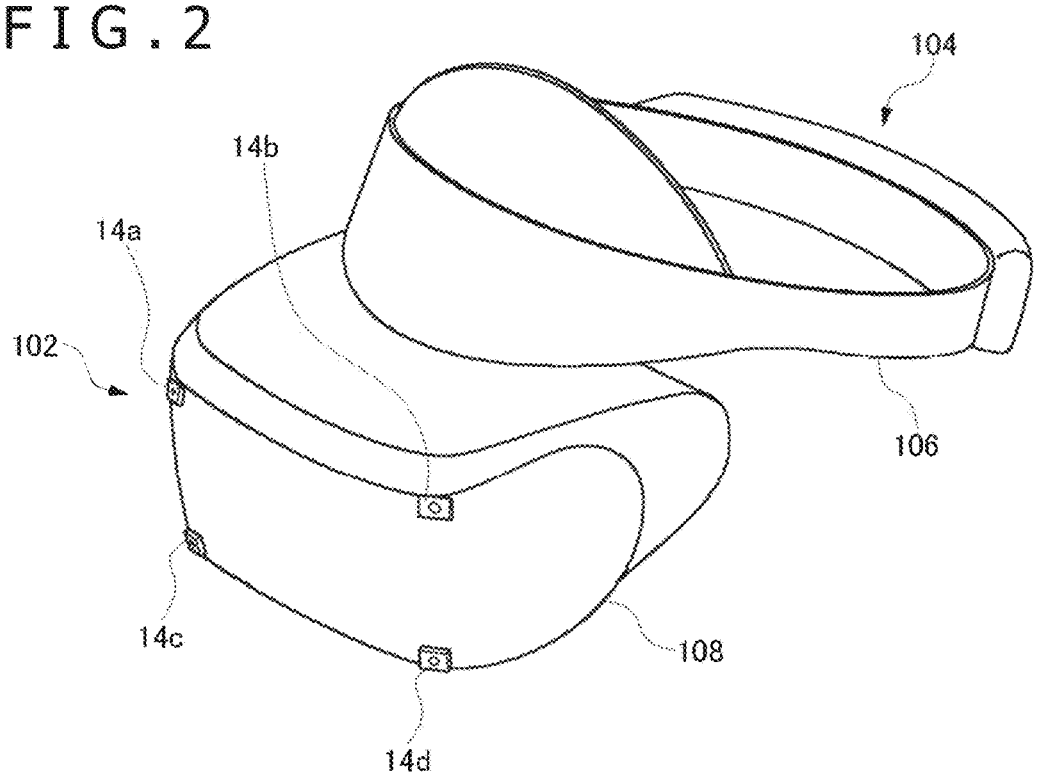
FIG. 2 is a view for illustrating an example of an exterior shape of a head-mounted display (HMD) of the present embodiment.

FIG. 2 illustrates an example of an exterior shape of the HMD 100. The HMD 100 includes an output mechanism section 102 and a wearing mechanism section 104. The wearing mechanism section 104 includes a wearing band 106 which runs around the head portion when the HMD 100 is worn by the user to secure the HMD 100 to the head portion. The wearing band 106 has a material or a structure which allows adjustment of a length thereof according to a head circumference of the user.

The output mechanism section 102 includes a housing 108 having such a shape as to cover the left and right eyes in a state in which the user is wearing the HMD 100 and is internally provided with the display panels facing the eyes at the time of the wearing. The display panel may be a liquid crystal panel, an organic electroluminescence (EL) panel, or the like. Inside the housing 108 are further provided the pair of left and right optical lenses which are positioned between the display panels and the eyes of the user and increase a viewing angle of the user. The HMD 100 may further be provided with speakers or earphones at positions corresponding to the ears of the user or may be configured such that an external earphone is connected to the HMD 100.

A plurality of imaging apparatuses 14a, 14b, 14c, and 14d are provided on an outer surface on the front side of the housing 108. When the front direction of the face of the user is set to a reference, the imaging apparatus 14a is mounted to an upper right corner of the outer surface on the front side such that a camera optical axis is oriented diagonally upward to the right, the imaging apparatus 14b is mounted to an upper left corner of the outer surface on the front side such that a camera optical axis is oriented diagonally upward to the left, the imaging apparatus 14c is mounted to a lower right corner of the outer surface on the front side such that a camera optical axis is oriented diagonally downward to the right, and the imaging apparatus 14d is mounted to a lower left corner of the outer surface on the front side such that a camera optical axis is oriented diagonally downward to the left. As a result of the arrangement of the plurality of imaging apparatuses 14 as described above, the entire imaging range obtained by adding the imaging ranges thereof includes the entire view field of the user. This view field of the user may be a view field of the user in the three-dimensional virtual space.

The HMD 100 transmits the sensor data detected by the IMU and the captured image data captured by the imaging apparatus 14 to the information processing apparatus 10 and receives the game image data and the game sound data generated by the information processing apparatus 10.

Figure 3:
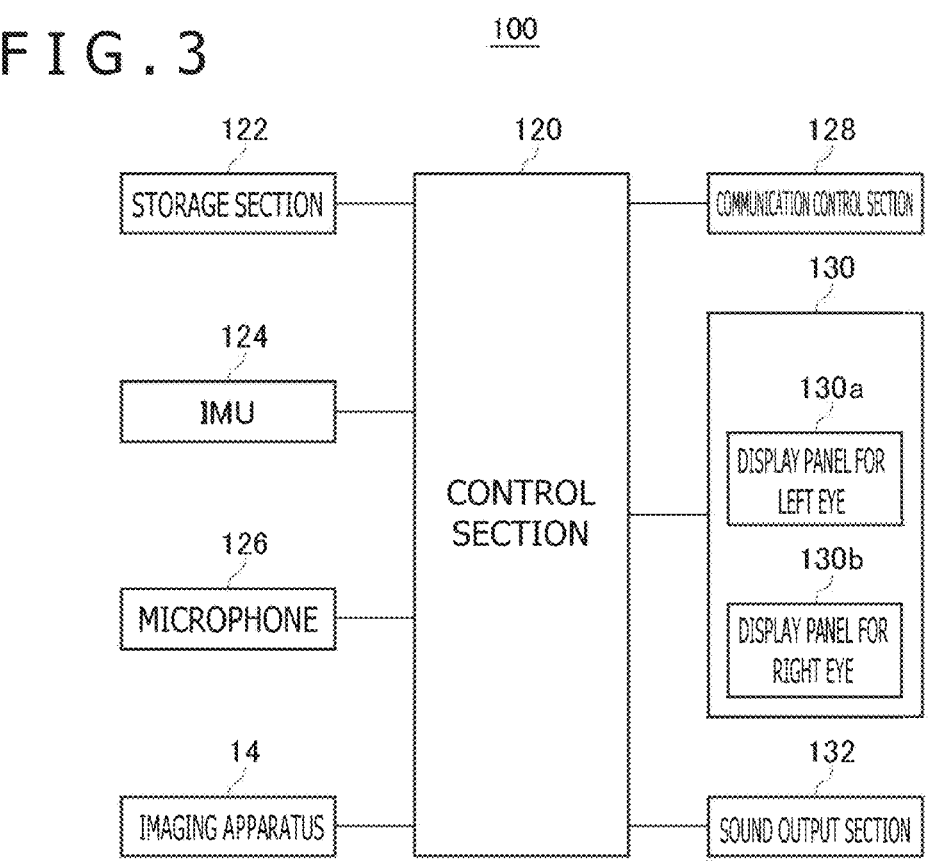
FIG. 3 is a diagram for illustrating function blocks of the HMD of the present embodiment.

FIG. 3 illustrates function blocks of the HMD 100. A control section 120 is a main processor which processes and outputs various types of data such as the image data, the sound data, and the sensor data and commands. A storage section 122 temporarily stores the data, the commands, and the like to be processed by the control section 120. An IMU 124 acquires the sensor data relating to the motion of the HMD 100. The IMU 124 may include at least a three-axis acceleration sensor and a three-axis angular velocity sensor. The IMU 124 detects a value (sensor data) of each axis component at a predetermined cycle (for example, 800 Hz).

A communication control section 128 transmits data output from the control section 120 to the external information processing apparatus 10 through wired or wireless communication via a network adaptor or an antenna. Moreover, the communication control section 128 receives data from the information processing apparatus 10 and outputs the received data to the control section 120.

When the control section 120 receives the game image data and the game sound data from the information processing apparatus 10, the control section 120 supplies the game image data to a display panel 130 to display the game image data and supplies the game sound data to a sound output section 132 to output sounds. The display panel 130 includes a display panel for left eye 130a and a display panel for right eye 130b, and the pair of parallax images are displayed on the display panels. Moreover, the control section 120 causes the sensor data from the IMU 124, the sound data from a microphone 126, and the captured image data from the imaging apparatus 14 to be transmitted from the communication control section 128 to the information processing apparatus 10.

Figure 4B:
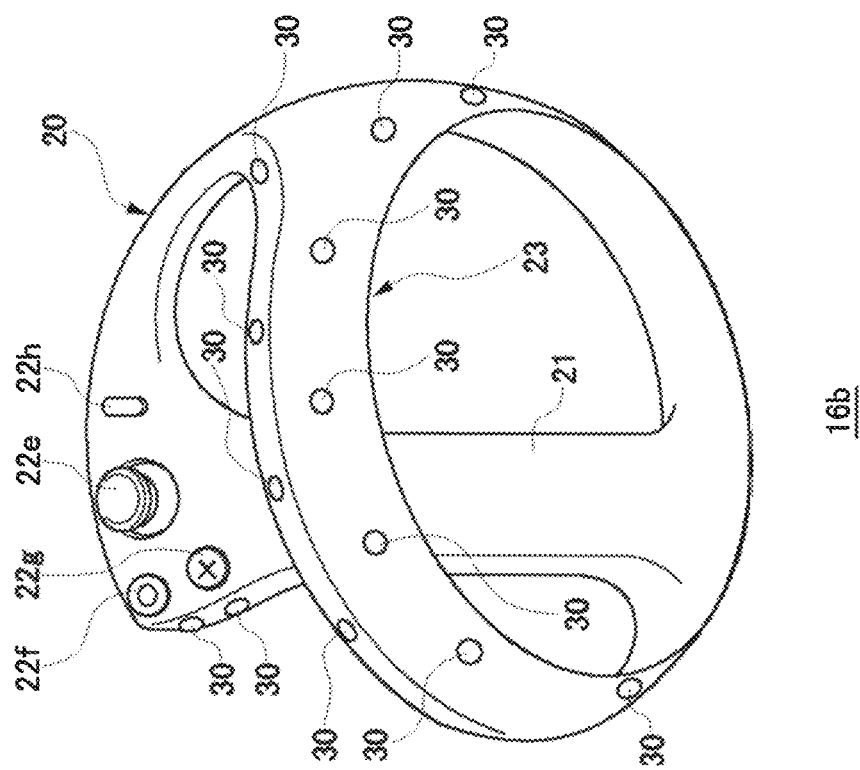
FIGS. 4A and 4B are views for illustrating shapes of input devices of the present embodiment.
Figure 4A:
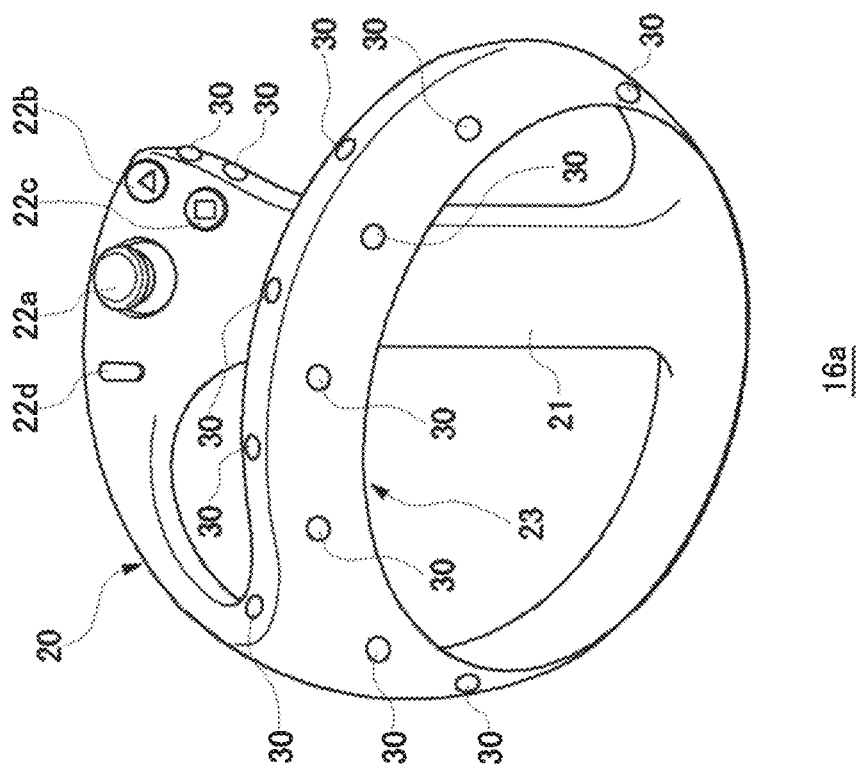

FIG. 4A illustrates a shape of an input device 16a for the left hand. The input device 16a for the left hand includes a case body 20, a plurality of operation members 22a, 22b, 22c, and 22d operated by the user (when the operation members are not particularly distinguished from one another, each of the operation members is hereinafter referred to an "operation member 22"), and a plurality of markers 30 which emit light to the outside of the case body 20. The marker 30 may include an emission section in a circular cross-sectional shape. The operation members 22 may include an analog stick operated to tilt and a button of push type. The case body 20 includes a hold portion 21 and a curved portion 23 which connects a case body top portion and a case body bottom portion, and the user inserts the left hand into the curved portion 23 to hold the hold portion 21. The user uses the thumb of the left hand to operate the operation members 22a, 22b, 22c, and 22d in a state in which the user is holding the hold portion 21.

FIG. 4B illustrates a shape of an input device 16b for the right hand. The input device 16b for the right hand includes the case body 20, a plurality of operation members 22e, 22f, 22g, and 22h operated by the user (when the operation members are not particularly distinguished from one another, each of the operation members is hereinafter referred to the "operation member 22"), and a plurality of the markers 30 which emit light to the outside of the case body 20. The operation members 22 may include an analog stick operated to tilt and a button of push type. The case body 20 includes the hold portion 21 and the curved portion 23 which connects the case body top portion and the case body bottom portion, and the user inserts the right hand into the curved portion 23 to hold the hold portion 21. The user uses the thumb of the right hand to operate the operation members 22e, 22f, 22g, and 22h in the state in which the user is holding the hold portion 21.

Figure 5:
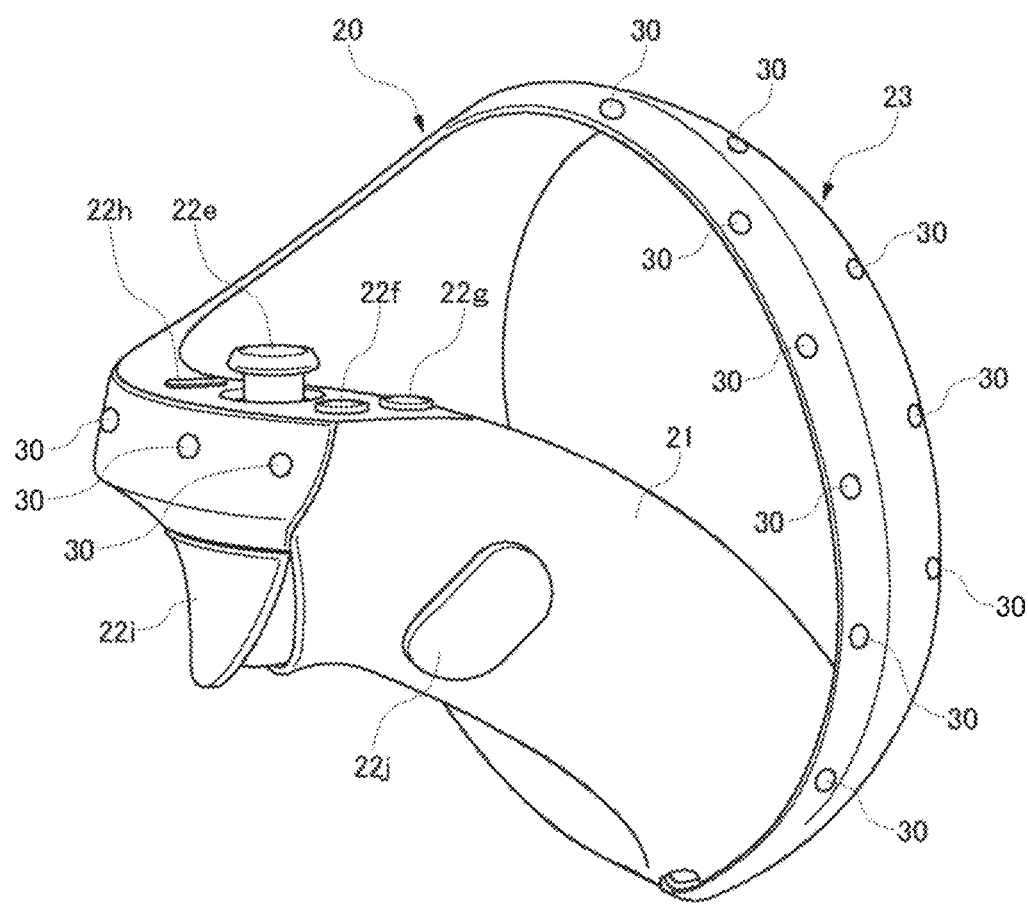
FIG. 5 is a view for illustrating the shape of the input device of the present embodiment.

FIG. 5 illustrates the shape of the input device 16b for the right hand. The input device 16b includes operation members 22i and 22j in addition to the operation members 22e, 22f, 22g, and 22h illustrated in FIG. 4B. The user uses the forefinger of the right hand to operate the operation member 22i and uses the middle finger to operate the operation member 22j in a state in which the user holds the hold portion 21. When the input device 16a and the input device 16b are not particularly distinguished from each other, each of the input device 16a and the input device 16b is hereinafter referred to as the "input device 16."

In the operation member 22 provided to the input device 16, a touch sensing function for recognizing the finger even when the operation member 22 is not pressed but is only touched may be installed. Regarding the input device 16b for the right hand, each of the operation members 22f, 22g, and 22j may have a touch sensor of capacitive type. Note that the touch sensor may be installed in another operation member 22, but it is preferred that the touch sensor be installed in the operation member 22 which does not come in contact with a placement surface such as a table when the input device 16 is placed on the placement surface.

The marker 30 is a light emission section which emits light to the outside of the case body 20 and includes a resin portion which scatters and emits the light toward outside from a light source such as a light emitting diode (LED) element on the surface of the case body 20. The marker 30 is captured by the imaging apparatus 14 and is used for tracking processing for the input device 16.

The information processing apparatus 10 uses the captured image by the imaging apparatus 14 for the tracking processing of the input device 16 and simultaneous localization and mapping (SLAM) processing of the HMD 100. In the present embodiment, gray scale images captured at 60 frames/second out of images captured at 120 frames/second captured by the imaging apparatus 14 may be used for the tracking processing for the input devices 16, and full-color images captured at 60 frames/second may be used for the processing of simultaneously executing self-position estimation and environmental map creation for the HMD 100.

Figure 6:
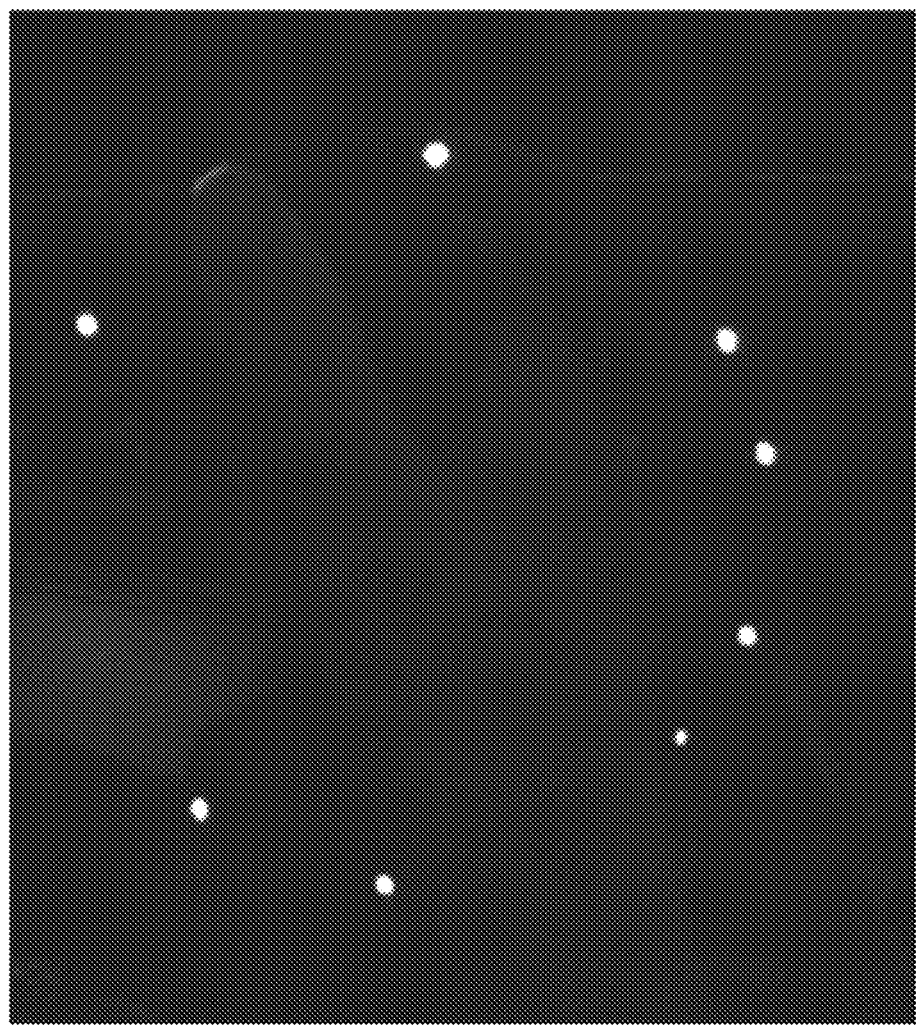
FIG. 6 is a view for illustrating an example of a part of an image acquired by capturing the input device in the present embodiment.

FIG. 6 illustrates an example of a part of an image acquired by capturing the input device 16. This image is an image acquired by capturing the input device 16b held by the right hand, and images of the plurality of markers 30 which emit the light are included. In the HMD 100, the communication control section 128 transmits, in real time, the image data captured by the imaging apparatus 14 to the information processing apparatus 10.

Figure 7:
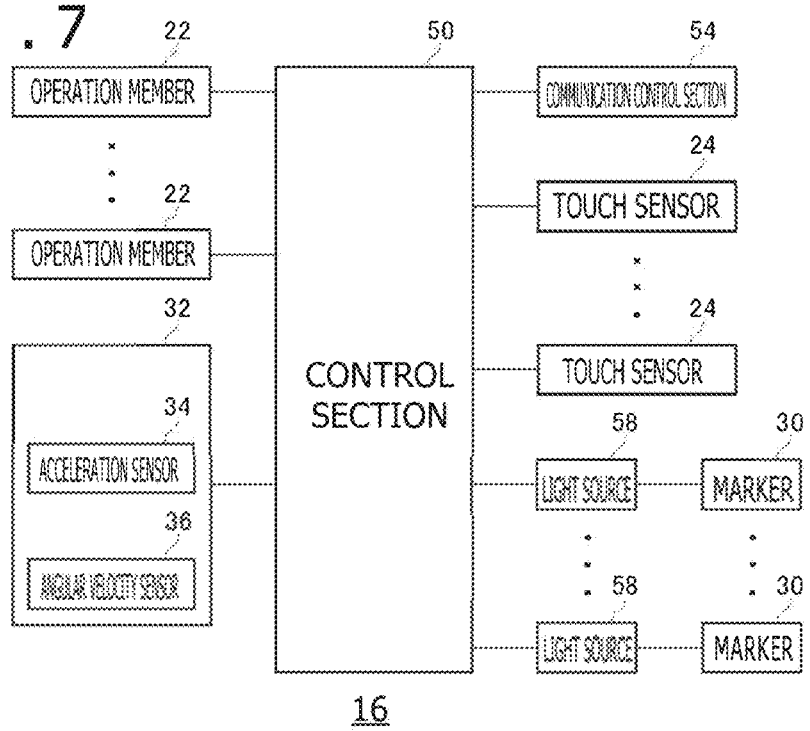
FIG. 7 is a diagram for illustrating function blocks of the input device of the present embodiment.

FIG. 7 illustrates function blocks of the input device 16. A control section 50 receives the operation information input to the operation members 22. Moreover, the control section 50 receives the sensor data detected by an IMU 32 and the sensor data detected by touch sensors 24. As described above, the touch sensors 24 are attached to at least some of the plurality of operation members 22 and detect the state in which the fingers of the user are in contact with the operation members 22.

The IMU 32 acquires the sensor data relating to the motion of the input device 16 and includes at least an acceleration sensor 34 which detects three-axis acceleration data and an angular velocity sensor 36 which detects three-axis angular velocity data. The acceleration sensor 34 and the angular velocity sensor 36 detect a value (sensor data) of each axis component at a predetermined cycle (for example, 800 Hz). The control section 50 supplies the received operation information and sensor data to the communication control section 54, and the communication control section 54 transmits the operation information and the sensor data to the information processing apparatus 10 through wired or wireless communication via a network adaptor or an antenna.

The input device 16 includes a plurality of light sources 58 for lighting the plurality of markers 30. The light source 58 may be an LED element which emits light in a predetermined color. When the communication control section 54 acquires a light emission instruction from the information processing apparatus 10, the control section 50 causes the light sources 58 to emit light on the basis of the light emission instruction, thereby lighting the markers 30. Note that, in the example illustrated in FIG. 7, one light source 58 is provided to one marker 30, but one light source 58 may light a plurality of markers 30.

Figure 8:
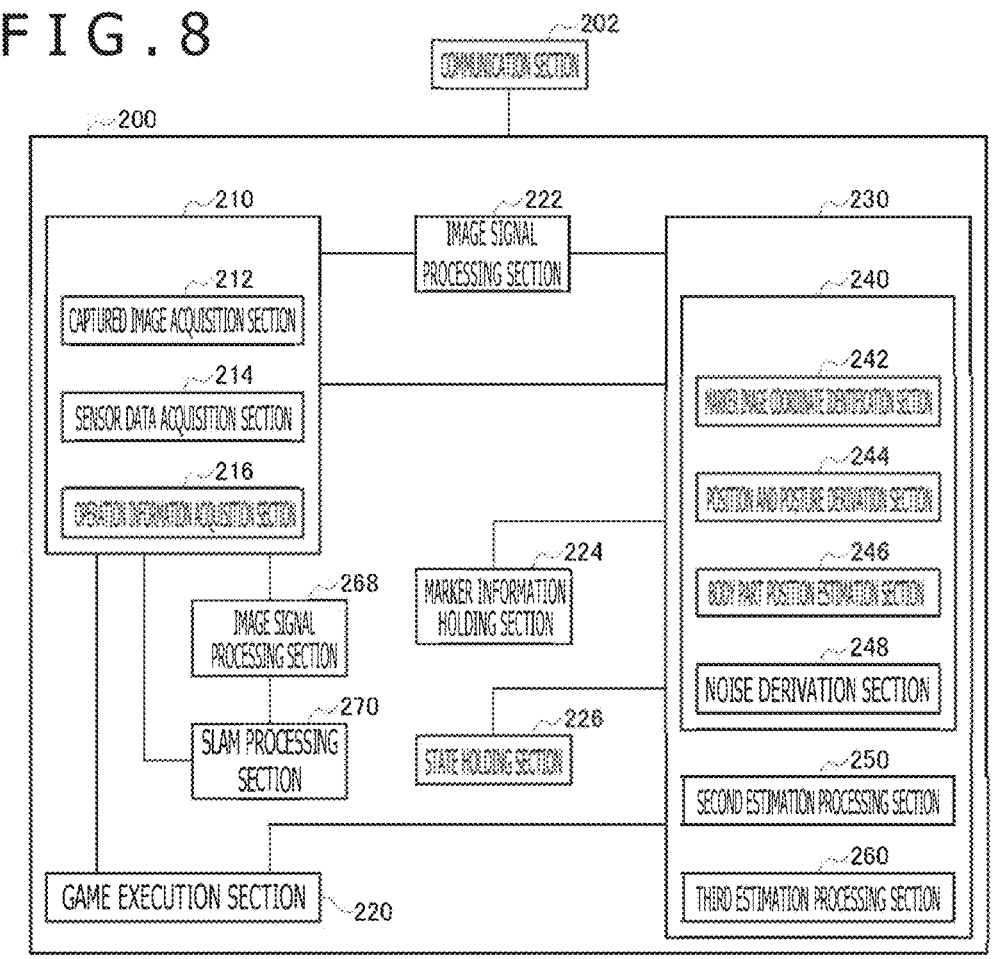
FIG. 8 is a diagram for illustrating function blocks of an information processing apparatus of the present embodiment.

FIG. 8 illustrates function blocks of the information processing apparatus 10. The information processing apparatus 10 includes a computer, and various functions illustrated in FIG. 8 are implemented by the computer executing a program. The computer includes, as hardware, a memory to which the program is loaded, one or more processors which execute the loaded program, an auxiliary storage device, and other large-scale integration circuits (LSIs). The processor includes a plurality of electronic circuits including semiconductor integrated circuits and the LSIs, and the plurality of electronic circuits may be mounted on one chip or may be mounted on a plurality of chips. The function blocks illustrated in FIG. 8 are implemented by cooperation between the hardware and software, and it is understood by a person skilled in the art that these function blocks are implemented in various forms through only hardware, only software, or a combination thereof.

In the present embodiment, the information processing apparatus 10 basically tracks the position and the posture of the HMD 100 being the device provided with the imaging apparatus 14 and uses the captured images thereof to track the input devices 16 being the other devices. These devices are common in such a point that the positions and the postures of these devices possibly change by being worn on the body of the user or being held by the user, but a difference occurs in a tracking method, and consequently, a characteristic of acquiring a result depending on whether or not the imaging apparatus 14 is provided.

That is, the device provided with the imaging apparatus 14 can basically be tracked independently of the state of the device itself through a technology such as the SLAM, but the tracking of the device being the subject is difficult in a period in which the device is deviated from the angle of view. Thus, the information processing apparatus 10 has a function of, for example, using the position and the posture of the former device as a reference to estimate the position and the posture of the latter device on the basis of a skeleton model of a human.

In the present embodiment, a description is given of an example in which the HMD 100 is the former device and the input device 16 is the latter device, but the type of each of the devices is not particularly limited, and these devices can be expressed as a "first device" and a "second device." The first device and the second device may be worn on (including "held by") any part of the body. Moreover, a section which acquires the state of the first device is not particularly limited as long as the section can track the first device continuously to such a degree as the position and posture can be used as the references.

The information processing apparatus 10 includes a processing section 200 and a communication section 202, and the processing section 200 includes a data acquisition section 210, a game execution section 220, an image signal processing section 222, a marker information holding section 224, a state holding section 226, a first device information acquisition section 269, and a second device information acquisition section 230. The communication section 202 receives the operation information relating to the operation members 22 transmitted from the input devices 16 and the sensor data and supplies the received operation information and the sensor data to the data acquisition section 210. Moreover, the communication section 202 receives the captured image data and the sensor data transmitted from the HMD 100 and supplies the captured image data and the sensor data to the data acquisition section 210. The data acquisition section 210 includes a captured image acquisition section 212, a sensor data acquisition section 214, and an operation information acquisition section 216.

(SLAM Function)

The captured image acquisition section 212 acquires the full-color image for SLAM processing of the HMD 100 and supplies the full-color image to the image signal processing section 268 of the first device information acquisition section 269. The image signal processing section 268 applies image signal processing such as noise reduction and optical correction (shading correction) to the image data and supplies, to the SLAM processing section 270, the image data to which the image signal processing has been applied.

The sensor data acquisition section 214 acquires the sensor data transmitted from the HMD 100 and supplies the sensor data to the SLAM processing section 270. The SLAM processing section 270 simultaneously executes the self position estimation and the environment map creation of the HMD 100 on the basis of the image data supplied from the captured image acquisition section 212 and the sensor data supplied from the sensor data acquisition section 214.

(First Estimation Function Through Use of Captured Images)

The captured image acquisition section 212 acquires the grayscale image for the tracking processing for the input devices 16 and supplies the grayscale image to the image signal processing section 222. The image signal processing section 222 applies image signal processing such as the noise reduction and the optical correction (shading correction) to the image data and supplies, to the first estimation processing section 240 of the second device information acquisition section 230, the image data to which the image signal processing has been applied.

The first estimation processing section 240 includes a marker image coordinate identification section 242, a position and posture derivation section 244, a body part position estimation section 246, and a noise derivation section 248 and implements the first estimation function of estimating the position and the posture of each of the input devices 16 on the basis of the image acquired by capturing the input devices 16. The first estimation processing section 240 extracts, from the captured image, marker images obtained by capturing a plurality of the markers 30 of the input device 16 and estimates the position and the posture of the input device 16 from the extracted plurality of marker images. The first estimation processing section 240 outputs the estimated position and posture of the input device 16, together with variances of noise (errors) thereof, to a third estimation processing section 260.

Note that the sensor data acquisition section 214 supplies, to the first estimation processing section 240, also the sensor data transmitted from the HMD 100 and the input devices 16 in preparation for the situation in which the input device 16 deviates from the image angle of the captured image as described later. This sensor data is used not only for estimating the position and the posture of each input device 16 from a movable range of the skeleton, but also for controlling the direction of the body with respect to the head portion when the skeleton model is to be set.

(Second Estimation Function Through Use of Sensor Data)

The sensor data acquisition section 214 acquires the sensor data transmitted from the input devices 16 and supplies the sensor data to the second estimation processing section 250. The second estimation processing section 250 implements the second estimation function of estimating the position and the posture of the input device 16 on the basis of the sensor data indicating the acceleration and the angular velocity of the input device 16. In the present embodiment, the second estimation function is the function of executing the state prediction step in the Kalman filter, and the second estimation processing section 250 adds a change amount of a state vector (position, speed, and posture) obtained through integration operation of the supplied sensor data to the state vector at the previous time, thereby estimating a state vector at the current time. The second estimation processing section 250 outputs, to the third estimation processing section 260, the estimated state vector together with variances of noise thereof. Note that the noise accumulates in the change amount obtained by the integration operation as the time elapses, and hence the state vector (position, speed, and posture) estimated by the second estimation processing section 250 tends to deviate from the actual state vector (position, speed, and posture).

(Integration Function for Estimation Results)

The third estimation processing section 260 highly accurately derives the position and the posture of each input device 16 from the position and the posture of the input device 16 estimated by the first estimation processing section 240 and the state vector (position, speed, and posture) of the input device 16 estimated by the second estimation processing section 250. The third estimation processing section 260 may execute the filtering step (correction step) of the unscented Kalman filter (UKF). The third estimation processing section 260 acquires, as "prior estimate value," the state vector estimated by the second estimation processing section 250, acquires, as "observation value," the position and the posture estimated by the first estimation processing section 240, calculates Kalman gain, and obtains "posterior estimate value" obtained by correcting "prior estimate value" with use of the Kalman gain. "Posterior estimate value" highly accurately expresses the position and the posture of the input devices 16, is supplied to the game execution section 220, is recorded in the state holding section 226, and is used to estimate the state vector at the next time in the second estimation processing section 250.

A method of integrating analysis results obtained through use of the plurality of sensors such as the imaging apparatus 14 and the IMU 32 to increase the accuracy is known as the sensor fusion. In the sensor fusion, it may be required that a time at which the data is acquired by each sensor is expressed on a common time axis. In the information processing system 1, the capturing cycle of the imaging apparatus 14 and the sampling cycle of the IMU 32 are different from each other and are asynchronous, and hence, the third estimation processing section 260 can highly accurately estimate the positions and the postures of the input devices 16 by accurately managing the capturing time of the images and the detection time of the acceleration and the angular velocity.

The operation information acquisition section 216 acquires the operation information transmitted from the input devices 16 and supplies the acquired operation information to the game execution section 220. The game execution section 220 causes the game to proceed on the basis of the operation information and the position and posture information relating to the input devices 16 acquired by the second device information acquisition section 230.

Figure 9:
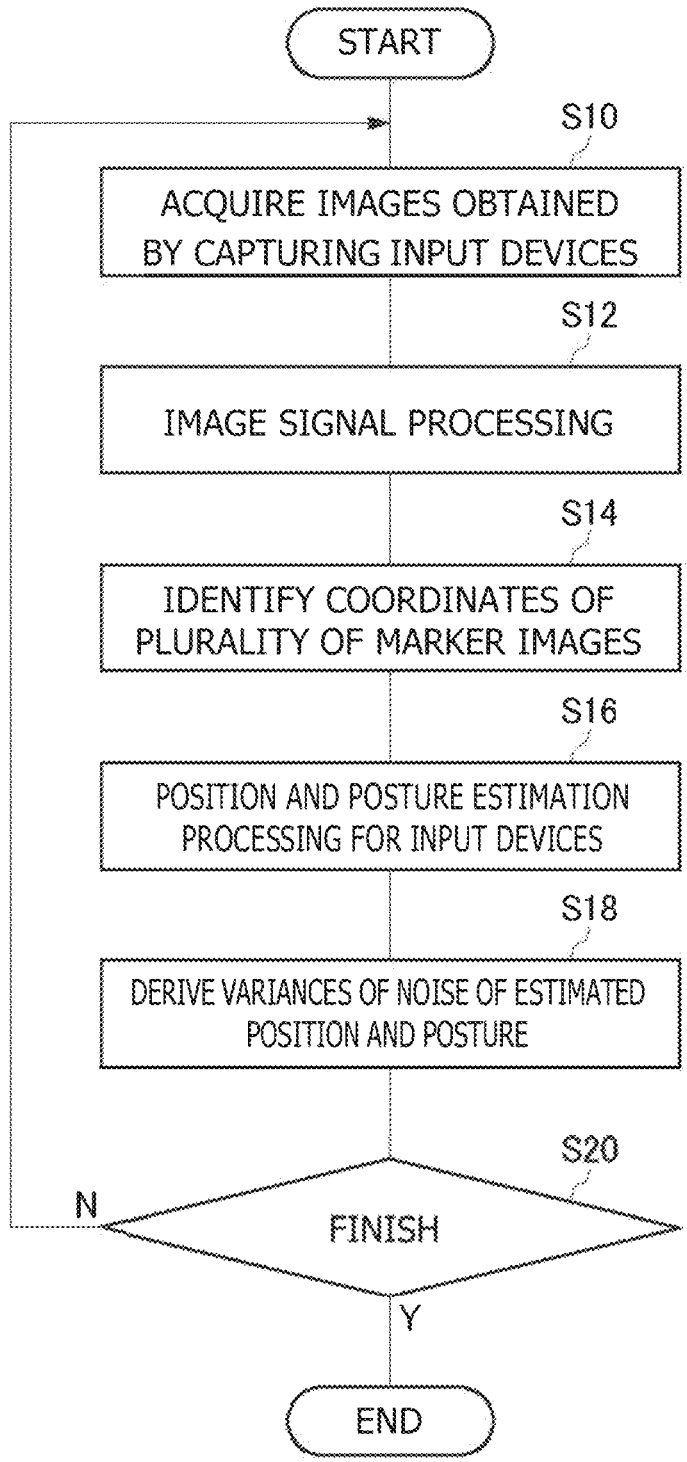
FIG. 9 is a flowchart for illustrating position and posture estimation processing of the present embodiment.

FIG. 9 is a flowchart for illustrating position and posture estimation processing by the first estimation processing section 240. The captured image acquisition section 212 acquires the image data obtained by capturing the input devices 16 (S10) and supplies the image data to the image signal processing section 222. The image signal processing section 222 applies the image signal processing such as the noise reduction and the optical correction to the image data (S12) and supplies, to the marker image coordinate identification section 242, the image data to which the image signal processing has been applied.

The marker image coordinate identification section 242 identifies representative coordinates of the plurality of marker images included in the captured images (S14). When the luminance of each pixel of the grayscale image is represented in 8 bits and takes a luminance value from 0 to 255, the marker image is captured as an image having high luminance as illustrated in FIG. 6. The marker image coordinate identification section 242 may identify a region in which pixels each having a luminance value equal to or higher than a predetermined value (for example, a luminance value of 128) continue and may calculate coordinates of a center of gravity of the continuous pixel region, thereby identifying the representative coordinates of the marker image.

Note that not only the marker images but also an image of an illumination device such as a lamp are included in the captured image. Thus, the marker image coordinate identification section 242 investigates whether the continuous pixel region having the luminance value equal to or higher than the predetermined value corresponds the marker image in light of several criteria. For example, in a case in which the continuous pixel region is too large or in a long shape, it is certain that this continuous pixel region does not correspond to the marker image, and hence the marker image coordinate identification section 242 may determine that such a continuous pixel region is not the marker image.

The marker image coordinate identification section 242 calculates the center-of-gravity coordinates of the continuous pixel region satisfying the predetermined criteria, thereby identifying the coordinates as the representative coordinates of the marker image (marker image coordinates) and stores the identified representative coordinates in a memory (not illustrated).

The marker information holding section 224 holds three-dimensional coordinates of each marker in a three-dimensional model of the input device 16 at a reference position and in a reference posture. As a method of estimating a position and a posture of an imaging apparatus which captures an object having a known shape and size in the three dimensions from a captured image of this object, a method of solving the perspective n-point (PNP) problem is known.

In the present embodiment, the position and posture derivation section 244 reads coordinates of N (N is an integer equal to or larger than 3) marker images from the memory (not illustrated) and estimates the position and the posture of the input device 16 from the read coordinates of the N marker images and the three-dimensional coordinates of the N markers in the three-dimensional model of the input device 16. The position and posture derivation section 244 uses the following (Expression 1) to estimate the position and the posture of the imaging apparatus 14 and derives the position and the posture of the input device 16 in the three-dimensional space on the basis of a result of the estimation.

[Math. 1]

$$s \begin{bmatrix} u \\ v \\ 1 \end{bmatrix} = \begin{bmatrix} f_x & 0 & c_x \\ 0 & f_y & c_f \\ 0 & 0 & 1 \end{bmatrix} \begin{bmatrix} r_{11} & r_{12} & r_{13} & t_1 \\ r_{21} & r_{22} & r_{23} & t_2 \\ r_{31} & r_{32} & r_{33} & t_3 \end{bmatrix} \begin{bmatrix} X \\ Y \\ Z \\ 1 \end{bmatrix}$$
(Expression 1)

In the expression, (u, v) denotes the marker coordinates in the captured image, and (X, Y, Z) denotes the position coordinates of the marker 30 in the three-dimensional space when the three-dimensional model of the input device 16 is at the reference position and in the reference posture. Note that the three-dimensional model is a model which has completely the same shape and the size of the input device 16 and has the markers arranged at the same positions and the marker information holding section 224 holds the three-dimensional coordinates of each marker in the three-dimensional model at the reference position and in the reference posture. The position and posture derivation section 244 reads the three-dimensional coordinates of each marker from the marker information holding section 224, thereby acquiring (X, Y, Z).

$(f_x, f_y)$ denotes a focal distance of the imaging apparatus 14, $(c_x, c_y)$ denotes an image principal point, and any one thereof is an internal parameter of the imaging apparatus 14. A matrix having $r_{11}$ to $r_{33}$ and $t_1$ to $t_3$ as elements is a rotation and translation matrix. In (Expression 1), (u, v), $(f_x, f_y)$, $(c_x, c_y)$, and (X, Y, Z) are known, and the position and posture derivation section 244 solves equations for N markers 30, thereby obtaining a rotation and translation matrix common thereto. In the present embodiment, the processing of estimating the position and the posture of the input device 16 is executed by solving the P3P problem.

Specifically, the position and posture derivation section 244 extracts, from the coordinates of a plurality of marker images identified by the marker image coordinate identification section 242, coordinates of any three marker images. The position and posture derivation section 244 reads the tree-dimensional coordinates of the markers in the three-dimensional model from the marker information holding section 224 and uses (Expression 1) to solve the P3P problem. When the position and posture derivation section 244 identifies the rotation and translation matrix common to the coordinates of the extracted three marker images, the position and posture derivation section 244 uses coordinates of marker images other than the coordinates of the extracted three marker images of the input device 16 to calculate a re-projection error.

The position and posture derivation section 244 extracts a predetermined number of combinations of the coordinates of three marker images. The position and posture derivation section 244 identifies the rotation and translation matrix of each of the extracted combinations of the coordinates of the three marker images and calculates the re-projection error of each thereof. After that, the position and posture derivation section 244 identifies a rotation and translation matrix providing the smallest re-projection error of the predetermined number of re-projection errors and derives the position and the posture of each of the input devices 16 (S16).

The noise derivation section 248 derives variance of the noise (error) of each of the estimated position and posture (S18). The variance value of the noise corresponds to a reliability degree of each of the estimated position and posture, the variance value is small when the reliability degree is high, and the variance value is large as the reliability degree is low. The noise derivation section 248 may derive the variance of the noise on the basis of the distance between the imaging apparatus 14 and the input device 16 and the position of the marker image within the image angle. For example, when the imaging apparatus 14 and the input device 16 are remote from each other or are extremely close to each other or when the marker image is positioned at an end of the captured image, the accurate derivation of the center-of-gravity coordinates of the marker image is difficult, and hence, a large noise variance tends to be derived.

Note that the reliability degree of each of the position and the posture estimated during the tracking processing (during the execution of the first estimation function) is certainly high, and hence, the noise derivation section 248 may set the variance of the nose of each of the estimated position and the estimated posture to a small fixed value. For example, the noise derivation section 248 may set the variance of the position noise during the tracking processing to "0.5 mm" and may supply the variance to the third estimation processing section 260. The first estimation processing section 240 may output the variances of the position noise and the posture noise to the third estimation processing section 260 together with information relating to the estimated position and posture during the tracking processing, but the first estimation processing section 240 may output, to the third estimation processing section 260, the variances once at the start of the tracking processing when the variances of the position noise and the posture noise are fixed values, and the third estimation processing section 260 may store and use the variances of the noise.

The position and posture estimation processing by the first estimation processing section 240 is executed at the capturing cycle (60 frames/second) of the images for tracking the input devices 16 (N in S20). When the game execution section 220 finishes the game, the position and posture estimation processing by the first estimation processing section 240 is finished (Y in S20).

Figure 10:
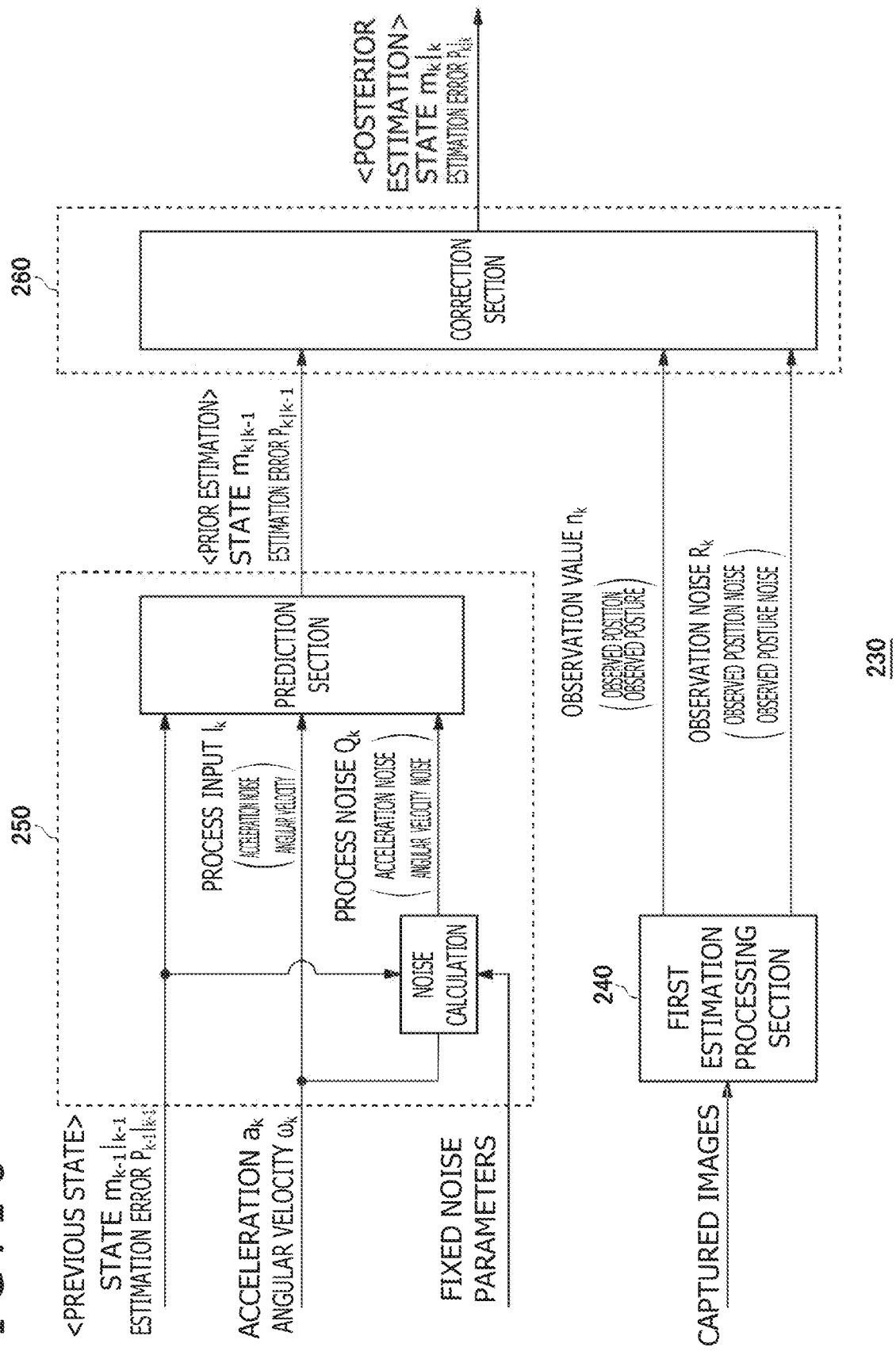
FIG. 10 is a diagram for illustrating an internal configuration of an estimation processing section of the present embodiment.

FIG. 10 illustrates an internal configuration of the second device information acquisition section 230. The first estimation processing section 240 outputs, to the third estimation processing section 260, the estimated position and posture at a time k as "observation value $n_k$" and the variances of the position noise and the posture noise as "observation noise $R_k$."

Observation value $n_k$: an observation vector at time k

Observation noise $R_k$: an error covariance matrix of the observation at time k The second estimation processing section 250 reads, from the state holding section 226, "state vector $m_{k-1|k-1}$" and "estimation error $P_{k-1|k-1}$" at a previous time (time k−1) and inputs "state vector $m_{k-1|k-1}$" and "estimation error $P_{k-1|k-1}$" to a prediction section. A state variable m of the present embodiment includes the position, the speed, and the posture of the input device 16, but may further include an acceleration bias and an angular velocity bias.

State vector $m_{k-1|k-1}$: a state vector at the time k−1 estimated on the basis of information up to the time k−1

Estimation error $P_{k-1|k-1}$: an estimation error covariance matrix in a state at the time k−1 estimated on the basis of the information up to the time k−1

Moreover, the second estimation processing section 250 acquires an acceleration $a_k$ and an angular velocity @k of the input device 16 from the sensor data acquisition section 214 and inputs the acceleration $a_k$ and the angular velocity $\omega_k$ as "process input $l_k$" to the prediction section.

Acceleration $a_k$: an acceleration at the time k

Angular velocity $\omega_k$: an angular velocity at the time k

Process input $l_k$: a process input vector at the time k

The second estimation processing section 250 calculates a variance of acceleration noise and a variance of angular velocity noise from the acceleration $a_k$, the angular velocity $@_k$, and fixed noise parameters (including an axis deviation, a scale deviation, a value deviation, and a bias deviation) and inputs these variances as "process noise $Q_k$" to the prediction section.

Process noise $Q_k$: an error covariance matrix of process input at the time k

The prediction section applies integration operation to each of the acceleration $a_k$ and the angular velocity $\omega_k$ to calculate change amounts (that is, a position change amount, a speed change amount, and a posture change amount) from "state vector $m_{k-1|k-1}$" and adds the change amounts to the "state vector $m_{k-1|k-1}$." The prediction section integrates the acceleration $a_k$ to calculate the speed change amount, integrates the speed estimated by using the speed change amount to calculate the position change amount, and integrates the angular velocity @k to calculate the posture change amount. The prediction section outputs "state vector $m_{k|k-1}$" and "estimation error $P_{k|k-1}$" to the third estimation processing section 260.

State vector $m_{k|k-1}$: a state vector at the time k estimated on the basis of information up to the time k−1

Estimation error $P_{k|k-1}$: an estimation error covariance matrix in a state at the time k estimated on the basis of the information up to the time k−1

The third estimation processing section 260 acquires "observation value $n_k$" and "observation noise $R_k$" from the first estimation processing section 240, acquires "state vector $m_{k|k-1}$" and "estimation error $P_{k|k-1}$" from the second estimation processing section 250, and calculates a Kalman gain for correcting "state vector $m_{k|k-1}$." The third estimation processing section 260 uses the Kalman gain to correct "state vector $m_{k|k-1}$" and outputs "state vector $m_{k|k}$" and "estimation error $P_{k|k}$."

State vector $m_{k|k}$: a state vector at the time k estimated on the basis of information up to the time k Estimation error $P_{k|k}$: an estimation error covariance matrix in a state at the time k estimated on the basis of the information up to the time k "State vector $m_{k|k}$" indicates the highly-accurately estimated position, speed, and posture and may be supplied to the game execution section 220, thereby being used for a game operation. "State vector $m_{k|k}$" and "estimation error $P_{k|k}$" are temporarily held in the state holding section 226 and are read when the estimation processing at a time k+1 is to be executed in the second estimation processing section 250.

In the second device information acquisition section 230, the estimation processing by the first estimation processing section 240 is executed at the cycle of 60 Hz, while the estimation processing by the second estimation processing section 250 is executed at the cycle of 800 Hz. Thus, the second estimation processing section 250 successively updates the state vector in a period from the output of the observation value to the output of the next observation value by the first estimation processing section 240 and the state vector is not corrected during this period. The second device information acquisition section 230 of the present embodiment executes the correction step through use of the state at the time k−1 immediately before the observation time k as a reference, that is, uses the observation value to correct the past state.

As described above, the second device information acquisition section 230 highly accurately estimates the position and the posture of the input device 16 in the period in which the tracking processing for the input device 16 is being executed. However, when the markers 30 of the input device 16 are no longer captured by the imaging apparatus 14, the first estimation processing section 240 may not execute the position and posture estimation processing illustrated in FIG. 9.

Figure 11:
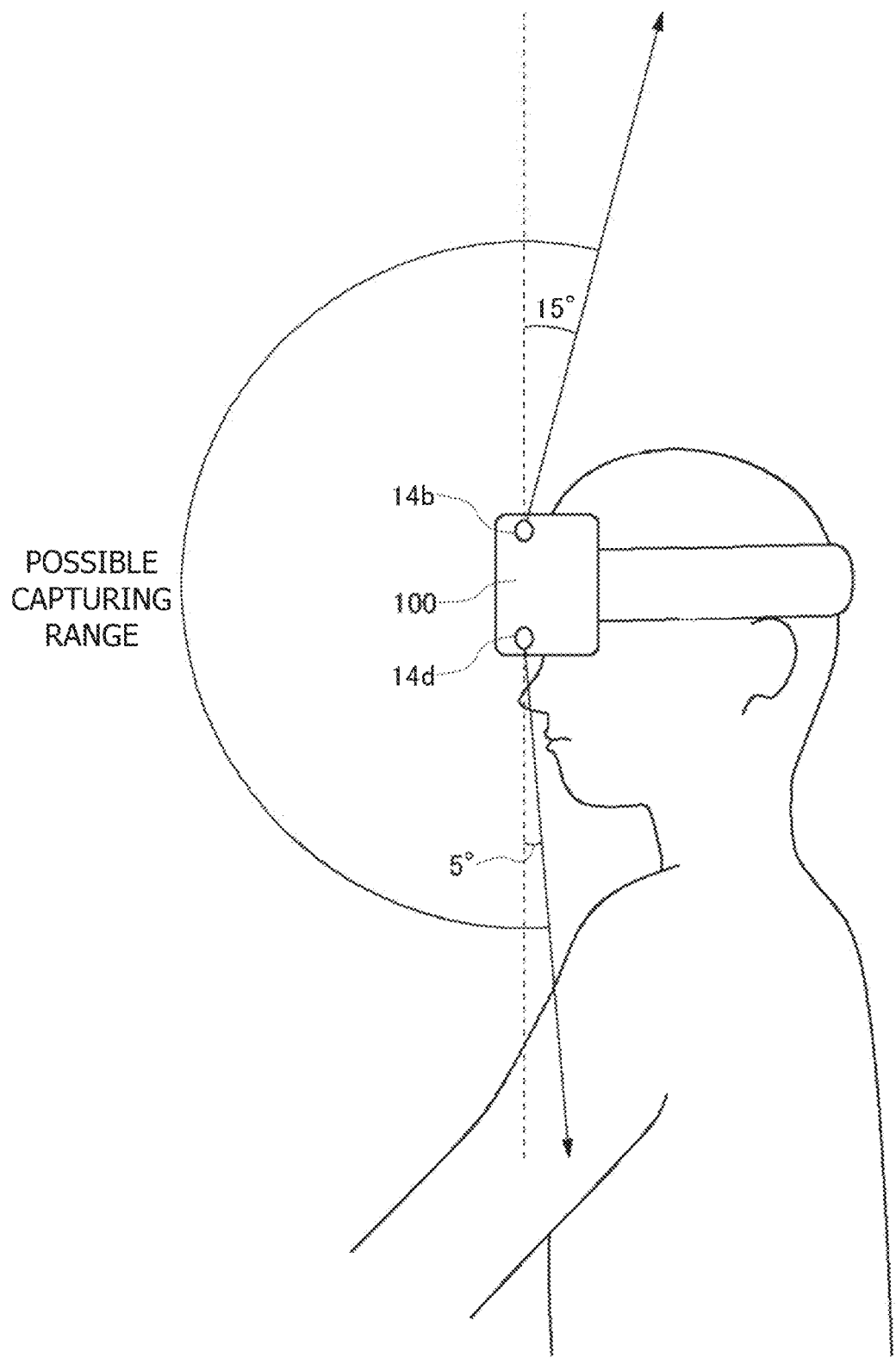
FIG. 11 is a view for schematically illustrating a range which can be captured by an imaging apparatus in the present embodiment.

FIG. 11 schematically illustrates a range which the imaging apparatus 14 mounted to the HMD 100 can capture. The imaging apparatus 14 is mounted to the front surface side of the HMD 100, and hence, the imaging apparatus 14 can capture a space on the front side of the HMD 100 and may not capture a space on the rear side. Thus, when the user moves the input device 16 backward of the face, the input device 16 deviates from the image angle of the imaging apparatus 14, and hence, the position and posture estimation processing illustrated in FIG. 9 may not be executed.

In preparation for this case, the body part position estimation section 246 estimates the position of the predetermined part in the body of the user on the basis of the estimated position of the input device 16 during the execution of the tracking processing. As the estimated position of the input device 16, the position estimated by the position and posture derivation section 244 may be used, but the estimation position included in the state vector output by the third estimation processing section 260 may be used.

Figure 12B:
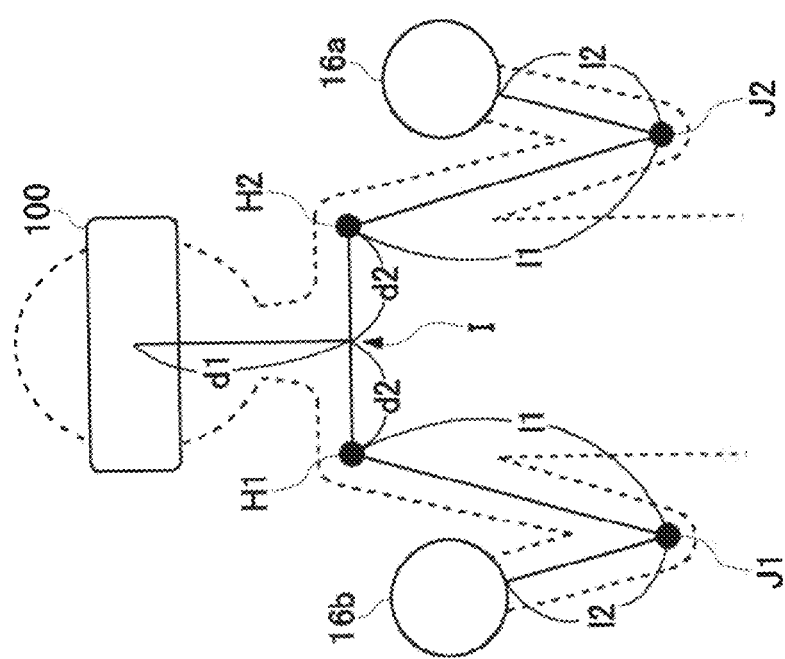
FIGS. 12A and 12B are views for illustrating an example of estimated positions of the HMD and the input devices in the present embodiment.
Figure 12A:
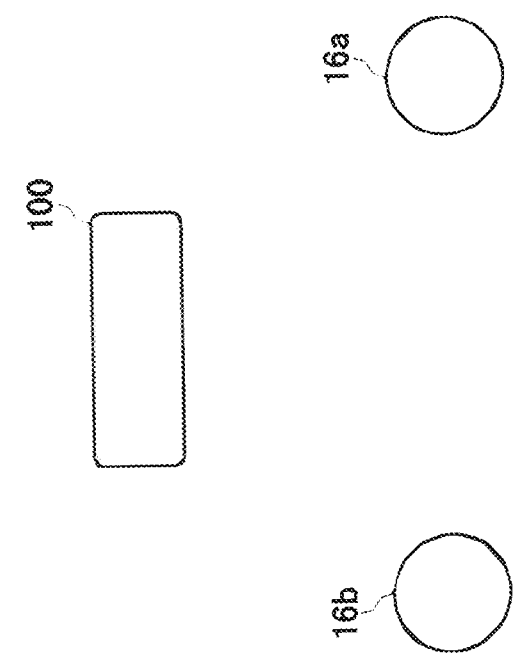

FIG. 12A illustrates an example of the estimated positions of the HMD 100 and the input devices 16 in a world coordinate system of the real space. The information processing apparatus 10 of the present embodiment executes the SLAM processing for the HMD 100 and the tracking processing for the input devices 16a and 16b, thereby estimating the positions and the postures of the HMD 100 and the input devices 16a and 16b in the world coordinate system.

FIG. 12B illustrates a method of estimating the position of the predetermined parts in the body of the user. The body part position estimation section 246 estimates positions of the elbows being the parts of the body from the position of the HMD 100 and the positions of the input devices 16.

First, the body part position estimation section 246 estimates a position H1 of the right shoulder and a position H2 of the left shoulder of the user from the position and the posture of the HMD 100. When the HMD 100 is not tilted, the body part position estimation section 246 may identify a point I separated downward from a center position of the HMD 100 by a distance d1, may identify the position H1 separated rightward by a distance d2 from the point I as the right shoulder position, and may identify the position H2 separated leftward by the distance d2 from the point I as the left shoulder position. These distances d1 and d2 may be fixed values, but may be set according to the size of the body of the user.

After that, the body part position estimation section 246 estimates a position J1 of the right elbow on the basis of the right shoulder position H1 and the position of the input device 16b for the right hand. At this time, the body part position estimation section 246 may estimate, through the inverse kinematics, the position J1 of the right elbow from an upper arm length l1 from the right shoulder to the elbow and a forearm length l2 from the elbow to the hand. Note that the upper arm length l1 and the forearm length l2 may be fixed values, but may be set according to the size of the body of the user.

Note that the number of candidates of the right elbow position J1 estimated through the inverse kinematics is infinite and hence it is preferred that the body part position estimation section 246 derive the most probable right elbow position J1 on the basis of parameters such as a behavior of the input device 16b up to now and a distance between the input device 16b and the HMD 100. Note that a function or a map which uniquely derives the right elbow position J1 according to a relative positional relation and a relative posture relation between the HMD 100 and the input device 16b may be prepared in advance and the body part position estimation section 246 may use this function or map to derive the right elbow position J1.

Similarly, the body part position estimation section 246 estimates a position J2 of the left elbow on the basis of the left shoulder position H2 and the position of the input device 16a for the left hand. Note that, when the body part position estimation section 246 has a function of identifying the elbow position of the user included in the full-color captured image through image analysis, thereby deriving the coordinates of the elbow position in the world coordinate space, this elbow position may be used.

Figure 13:
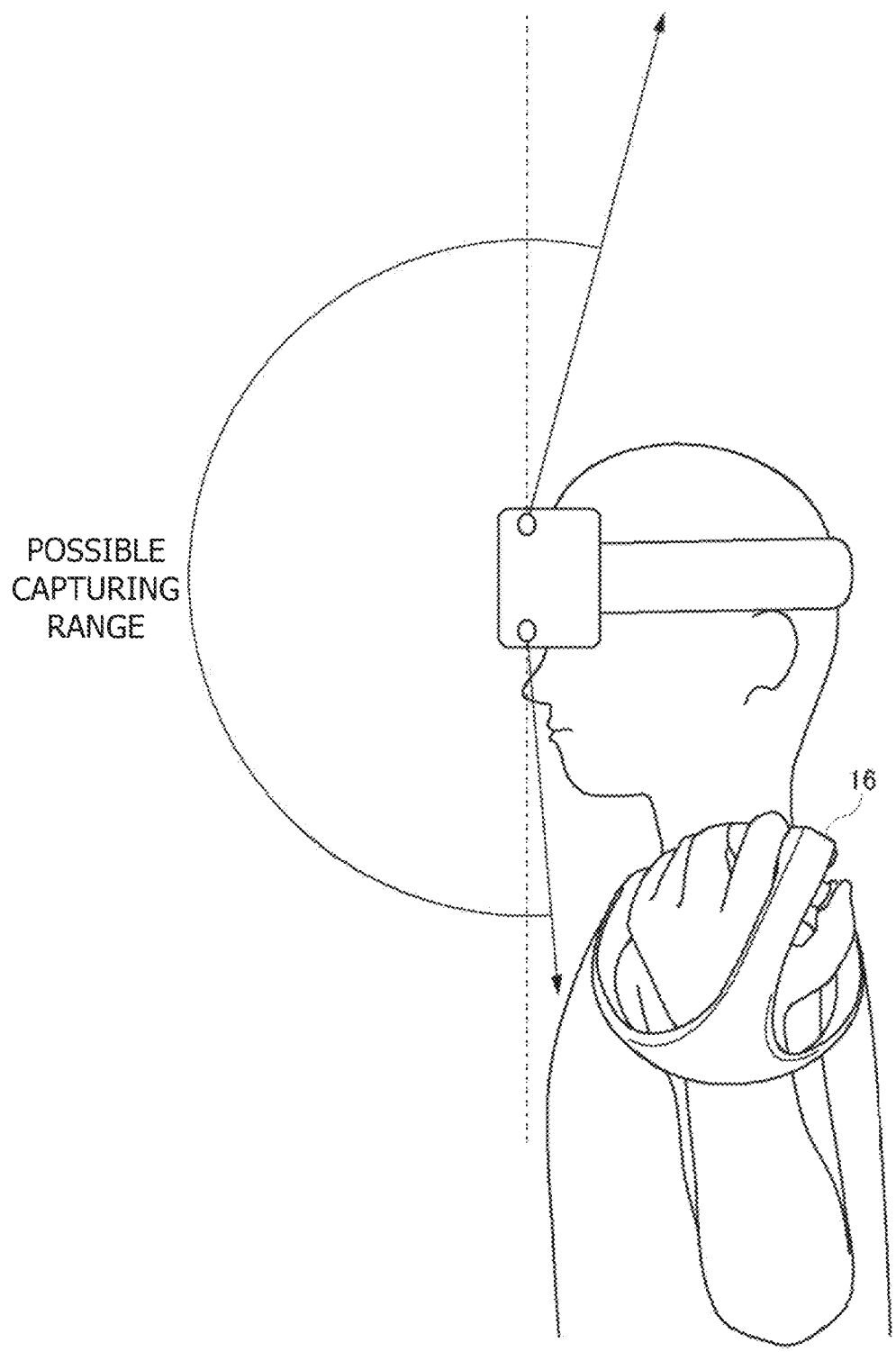
FIG. 13 is a view for illustrating a state in which the input device deviates from the possible imaging range in the present embodiment.

FIG. 13 illustrates a state in which the input device 16 deviates from the possible imaging range of the imaging apparatus 14. When the input device 16 deviates from the image angle of the imaging apparatus 14, the marker images are not included in the captured images. At this time, the marker image coordinate identification section 242 determines that the marker images may not be extracted from the captured image and notifies the position and posture derivation section 244 of a result of this determination. When the position and posture derivation section 244 recognizes that the tracking processing may not be executed in accordance with the determination result, the position and posture derivation section 244 switches an estimation mode to start the position estimation processing for the input devices 16 on the basis of the elbow position estimated by the body part position estimation section 246.

The position and posture derivation section 244 acquires, from the body part position estimation section 246, the elbow position estimated immediately before the marker images are not included in the captured image (immediately before the tracking becomes a lost state). The position and posture derivation section 244 derives, as the position of the input device 16, a position obtained through rotation about the obtained elbow position as a rotation center by a rotation amount corresponding to the sensor data.

Figure 14:
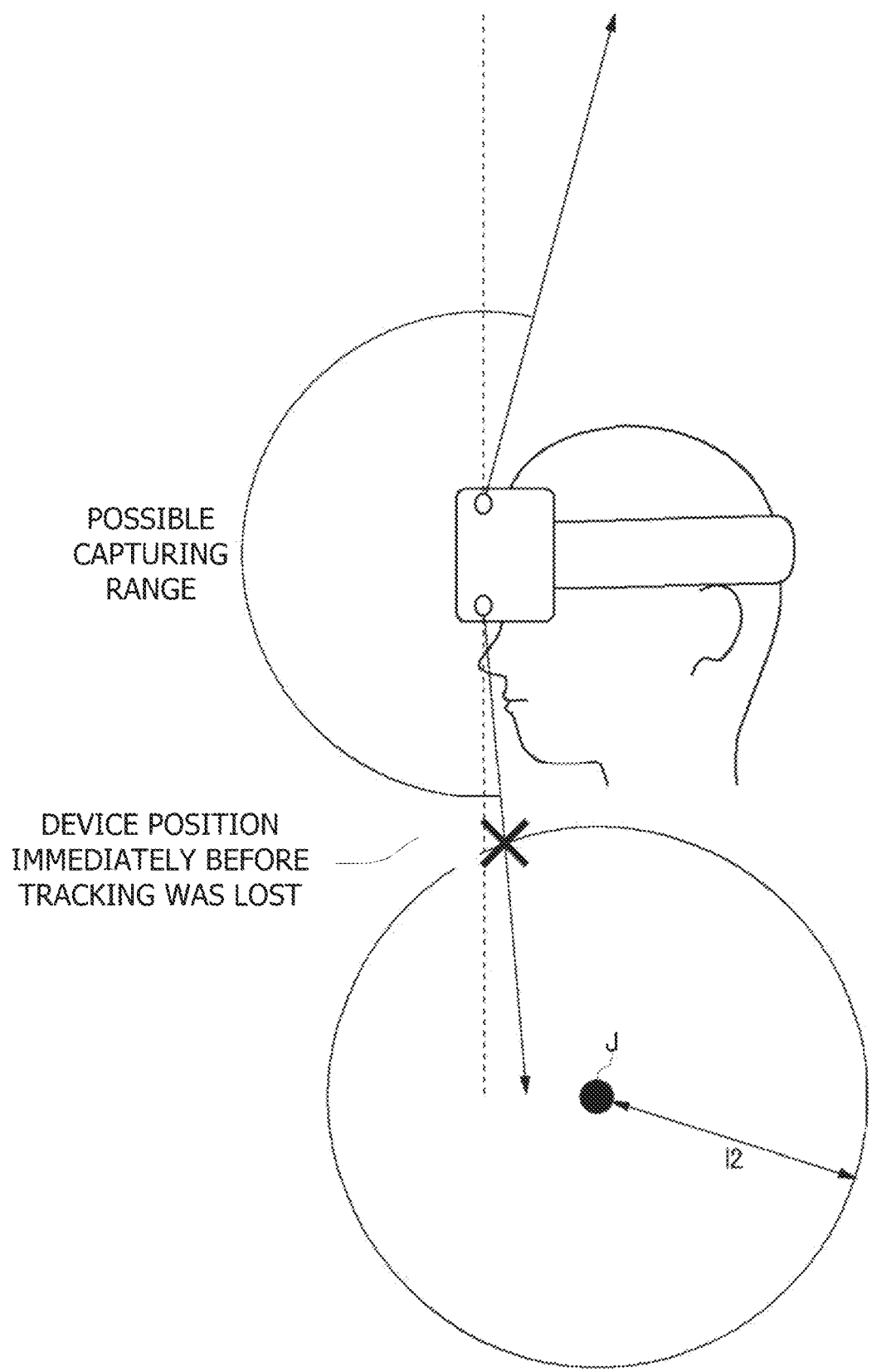
FIG. 14 is a view for describing processing of estimating the device position while an elbow position is considered as a base point in the present embodiment.

FIG. 14 is a view for describing the processing of estimating the device position while the elbow position is considered as the base point. A position indicated by a × mark in the view represents the position of the input device 16 estimated at the time when the markers 30 are captured last, and the elbow position J represents the position of the elbow estimated at this time. The position and posture derivation section 244 rotates a virtual forearm having a predetermined length by a rotation amount and a rotation direction corresponding to the angular velocity of the input device 16 about the elbow position J as the rotation center, thereby deriving the position of the input device 16. As illustrated in FIGS. 12A and 12B, the length of the forearm between the elbow position J and the input device 16 is 12, and hence, the position and posture derivation section 244 derives, as the position of the input device 16, a position on a sphere having the elbow position J as the rotation center and the radius 12 during continuation of the tracking lost state. The position derived as described above is not always accurate, but is estimated while the elbow position immediately before the occurrence of the tracking lost is considered as the base point, and hence can be considered as sufficiently accurate for the continuation of the game.

It is preferred that the body part position estimation section 246 move the skeleton model so as to follow the motion of the HMD 100, thereby maintaining a relative positional relationship between the position of the HMD 100 and the elbow position J favorable while the tracking lost state continues as described later.

The noise derivation section 248 derives the variance of the position noise during the tracking lost. The noise derivation section 248 sets the variance of the position noise during the tracking lost (when the marker images are not included in the captured images) larger than the variance of the position noise during the tracking processing (when the marker images are included in the captured images). In the example described above, the noise derivation section 248 sets the variance of the position noise during the tracking processing to 0.5 mm, but may derive the variance of the position noise equal to or larger than 5 mm during the tracking lost. As the rotation amount (rotation angle) about the elbow position J as the rotation center increases, the reliability degree of the estimation position decreases, and hence, the noise derivation section 248 may derive, when the rotation amount becomes large, a variance of the position noise larger than that at the time when the rotation amount is small. For example, when the rotation amount from the device position immediately before the tracking lost occurs is smaller than 20 degrees, the variance of the position noise may be set to 5 mm, and when the rotation amount is 20 degrees or more, the variance of the position noise may be set to 50 mm. The noise derivation section 248 may derive the variance of the position noise so as to increase linearly or nonlinearly according to the increase in rotation amount.

Note that, when the input device 16 moves into the image angle of the imaging apparatus 14 and hence the marker images come to be included in the captured images, the marker image coordinate identification section 242 extracts the marker images from the captured images, and the position and posture derivation section 244 returns the estimation mode to the previous mode, thereby resuming the position and posture estimation processing based on the marker images.

Figure 15:
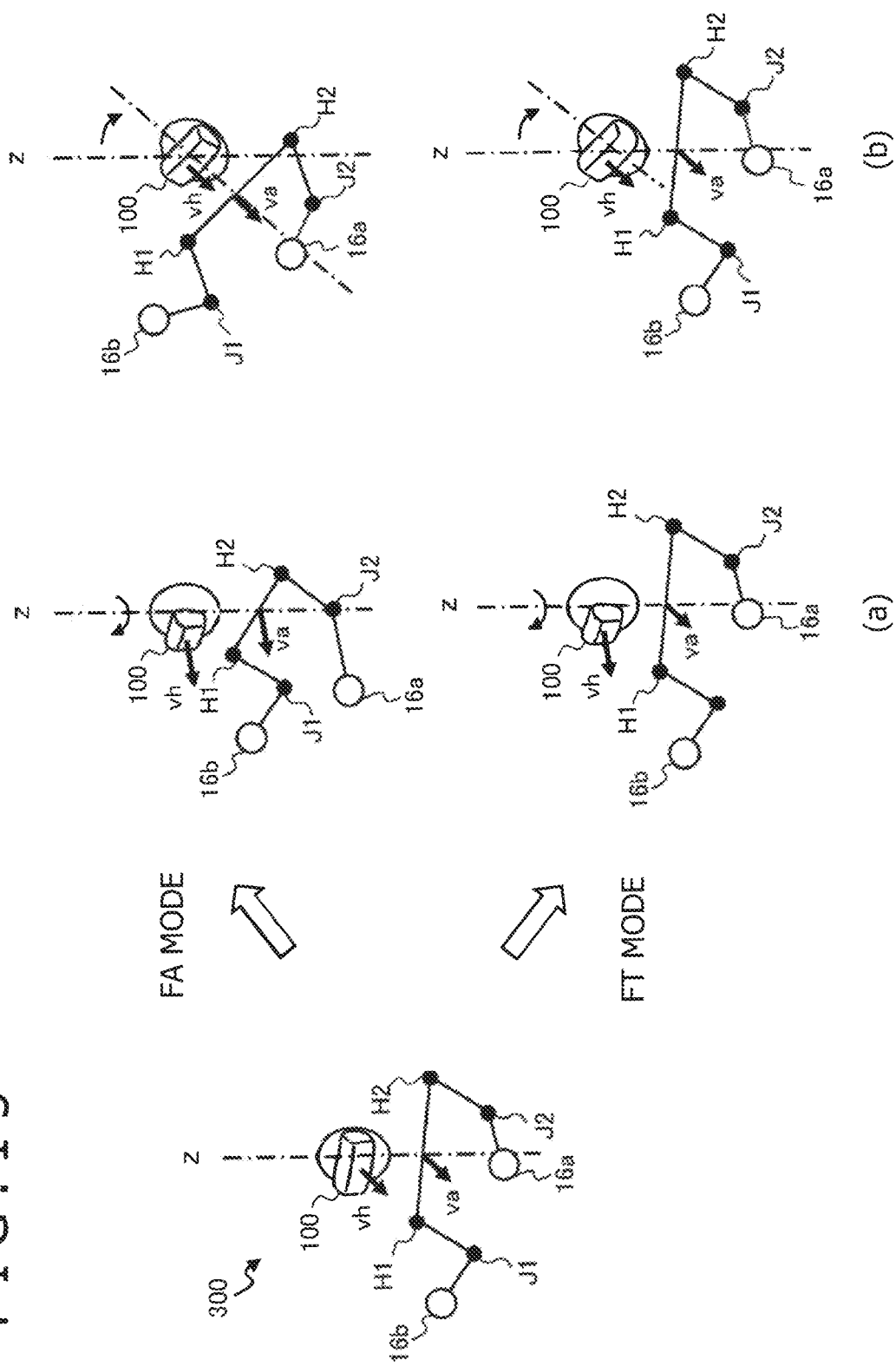
FIG. 15 depicts diagrams for describing modes relating to a state setting of a skeleton model for the HMD in the present embodiment.

A description is now given of a control method at the time when the skeleton model is caused to follow the motion of the HMD 100 in the state of the tracking lost. FIG. 15 depicts diagrams for describing the modes relating to a state setting of the skeleton model for the HMD 100 in the present embodiment. This diagram illustrates a plurality of states of the HMD 100 and the skeleton model in perspective views. As described above, when the input devices 16a and 16b held by both hands of the user are set to targets of the state acquisition, as the skeleton model, an arm model including both shoulders (positions H1 and H2) and both elbows (positions J1 and J2) is introduced as illustrated in FIG. 12B.

As described above, the body part position estimation section 246 derives the positions of the input devices 16a and 16b on the spheres each has the upper arm length as the radius about the each of the positions J1 and J2 of both elbows as the center in the state of the tracking lost. The estimation accuracy of the positions J1 and J2 of both elbows immediately after the tracking lost can be increased by introducing the arm model, and the positions of both elbows J1 and J2 can be updated so as to match the motion of the body estimated from the motion of the HMD 100 even when the state of the tracking lost continues subsequently.

In many cases, as illustrated at a left end of the diagram, a state 300 in which the face and the body of the user are oriented to the same direction is a natural posture, and under this assumption, the arm model can easily be set as described with reference to FIG. 12B. In details, it is sufficient if the body part position estimation section 246 may set the arm model such that a front direction of the arm model, that is, a direction of a vector va matches a front direction of the HMD 100, that is, a direction of a vector vh and such that the center axes (z axes) of the HMD 100 and the arm model match each other.

Meanwhile, when the user changes the posture of the head portion, the standard state as described above is not actually always maintained. That is, the user does not change the direction of the entire body, but may temporarily turn around or may tilt the head to the side, thereby changing a posture of the head only. When the arm model is set while assuming the state 300 in such a situation, it is conceivable that the positions J1 and J2 of the elbows separate from the actual positions, resulting in occurrence of large errors in the positions and the postures of the input devices 16a and 16b.

Thus, in the present embodiment, the body part position estimation section 246 changes a degree of following at which the arm model follows the head portion, consequently the HMD 100 according to the sensor data relating to the HMD 100 and the input devices 16a and 16b. In other words, "degree of following" is the number of parameters which are of parameters defining the motion of the arm model and on which constraints are imposed. Specifically, there are prepared a mode (hereinafter referred to as a "follow all (FA) mode") in which the arm model is caused to completely follow a translational motion and a rotational motion of the HMD 100 and a mode (hereinafter referred to as a "follow translation (FT) mode") in which the arm model is caused to follow the translational motion of the HMD 100 and not to follow the rotational motion, and the body part position estimation section 246 applies the switching control on the basis of the sensor data.

In the diagram, the state 300 is set to the initial state, and a change in the arm model at the time of an occurrence of the rotational motion of the HMD 100 is compared between the FA mode (upper row) and the FT mode (lower row). First, in a middle column (a) of the diagram, a case in which the HMD 100 is rotated in the yaw direction about the center axis (z axis) in the vertical direction of the head portion is illustrated. At this time, the body part position estimation section 246 rotates the arm model in the yaw direction by the same angle as that of the HMD 100 in the FA mode. As a result, the vector vh of the HMD 100 in the front direction and the vector va of the arm model in the front direction match each other. In the FT mode, the body part position estimation section 246 does not rotate the arm model. As a result, an angle difference occurs between the vector vh of the HMD 100 in the front direction and the vector va of the arm model in the front direction.

A right column (b) of the diagram illustrates a case in which the HMD 100 is rotated in the roll direction about the axis in the front-rear direction of the head portion. At this time, the body part position estimation section 246 rotates the arm model in the roll direction by the same angle as that of the HMD 100 in the FA mode. In the FT mode, the body part position estimation section 246 does not rotate the arm model. In any illustrated states, the method of acquiring the positions J1 and J2 of both elbows from the arm model set as in such a manner and deriving the position and the posture of each of the input devices 16a and 16b on the basis thereof may be as described before. Moreover, for a translational motion component of the HMD 100, not illustrated, the body part position estimation section 246 causes the arm model to execute a translational motion by the same amount.

Figure 16:
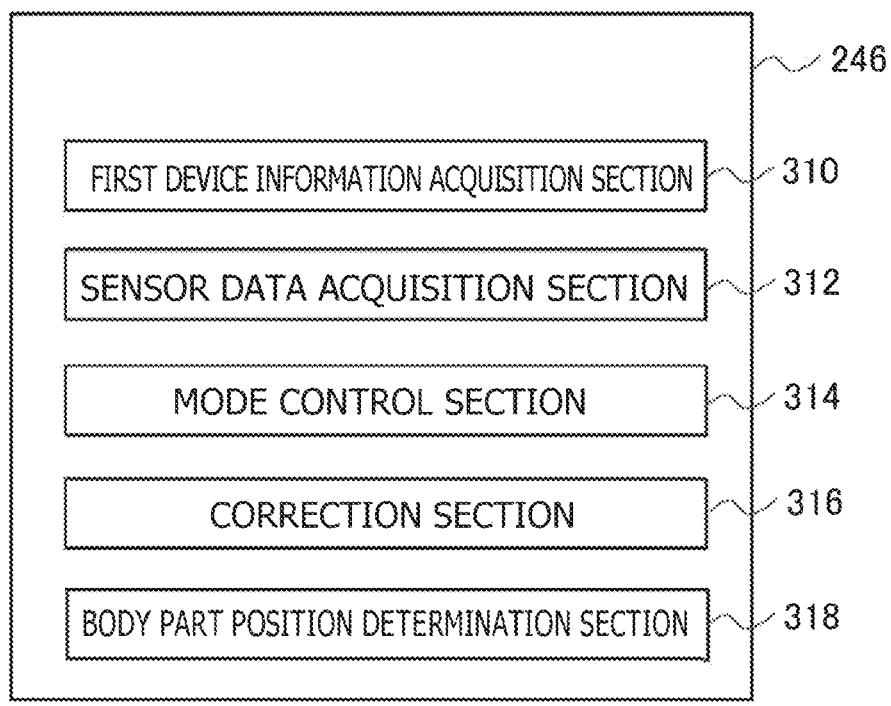
FIG. 16 is a diagram for illustrating, in more detail, a configuration of function blocks of a body part position estimation section of the present embodiment.

FIG. 16 illustrates, in more detail, a configuration of function blocks of the body part position estimation section 246 in more details. The body part position estimation section 246 includes a first device information acquisition section 310, a sensor data acquisition section 312, a mode control section 314, a correction section 316, and a body part position determination section 318. The first device information acquisition section 310 acquires the information relating to the position and the posture of the HMD 100 from the first device information acquisition section 269. The sensor data acquisition section 312 acquires the sensor data relating to the HMD 100 and the input devices 16 from the sensor data acquisition section 214.

The mode control section 314 controls the mode switching between the FA mode and the FT mode described above on the basis of the sensor data relating to the HMD 100 and the input devices 16. For example, the mode control section 314 sets the mode to the FA mode in a period in which the sensor data satisfies the following (Expression 2) and to the FT mode in the other period.

[Math. 2]

$$\|\omega_h - \omega_C\| < \frac{\|\omega_h\|}{2} \quad \text{(Expression 2)}$$

In Expression 2, $\omega_h$ and $\omega_c$ are angular velocities of the HMD 100 and the input device 16, respectively, in the world coordinate system. According to the mode control as given by (Expression 2), when a difference in the angular velocity between the HMD 100 and the input device 16 is smaller than a reference, it is determined that the head portion and the arms are rotated in the same manner, and the difference is equal to or larger than the reference, it is determined that only the head portion is rotated. In this configuration, influence of the operation speed itself on the determination is reduced by setting the reference as a variable using the angular velocity of the HMD 100 itself.

Note that the mode control section 314 may switch the mode to the FA mode when at least one of the two input devices 16a and 16b held by the left and right hands satisfies (Expression 2). As a result, it is possible to prevent the arm model from taking different behaviors between the left arm and the right arm or the mode from being easily switched to the FT mode due to noise of the measured angular velocity, and the like. The state in which the face and the body are oriented to the same direction is the standard as described originally, and hence, it is important to avoid creation of less probable unnatural state by imposing relatively strict conditions on the transition to the FT mode which allows the state in which the face and the body are oriented to different directions or continuation of this state.

The correction section 316 corrects the posture of the arm model such that an unnatural difference does not occur between the HMD 100 and the arm model. Specifically, the correction section 316 does not completely stop the rotation of the arm model and makes such correction of the arm model that the arm model gradually matches the orientation of the HMD 100 in the FT mode. For example, the correction section 316 rotates, during a period in which the HMD 100 is rotated greatly toward a direction of increasing a difference in angle from the arm model, the arm model in the same direction at a low angular velocity at a predetermined ratio. That is, the following is allowed at the predetermined ratio to a rotational motion of the HMD 100. As a result, it is possible to prevent the angle difference between the HMD 100 and the arm model from unnaturally increasing.

The correction section 316 further monitors the angle difference between the HMD 100 and the arm model in the FT mode and requests the mode control section 314 to switch the FT mode to the FA mode when this angle difference exceeds an upper limit set in advance. For example, the correction section 316 monitors whether or not the sensor data on the HMD 100 and the input devices 16 satisfies both (Expression 3) and (Expression 4).

[Math. 3]

$$\arccos \frac{v_{cf} \cdot v_{hf}}{|v_{cf}||v_{hf}|} \leq \theta_f \quad \text{(Expression 3)}$$

[Math. 4]

$$|a_{cr} - a_{hr}| \leq \theta_r \quad \text{(Expression 4)}$$

$V_{hf}$ and $V_{cf}$ of (Expression 3) are vectors of the HMD 100 and the input device 16, respectively, in the front direction in the world coordinate system. The former one corresponds to the vector vh of FIG. 15, and the latter one has a meaning similar to that of the vector va of FIG. 15. Moreover, $a_{hr}$ and $a_{cr}$ of (Expression 4) are rotation angles of the HMD 100 and the input device 16, respectively, in the roll direction from the standard state. $\theta_f$ and $\theta_r$ are upper limits imposed on the angles on the left sides of (Expression 3) and (Expression 4), respectively, and are set in advance on the basis of movable ranges of the body of the human and the like. As an example, $\theta_f$ is set to 90°, and $\theta_r$ is set to 60°.

The correction section 316 monitors that the angle difference between the HMD 100 and the arm model in the front direction does not exceed $\theta_f$ according to (Expression 3). Moreover, the correction section 316 monitors that the angle difference between the HMD 100 and the arm model in the roll direction does not exceed $\theta_r$ according to (Expression 4). Note that the correction section 316 may request the switch to the FA mode when at least one of the two input devices 16a and 16b held by the left and right hands satisfies one of (Expression 3) and (Expression 4). The mode control section 314 receives this request, thereby switching the FT mode to the FA mode.

As a result, the arm model subsequently follows the rotational motion of the HMD 100, and an angle difference exceeding the upper limit does not occur. For example, it is possible to prevent such an unnatural situation that the orientation of the face with respect to the body exceeds 90° or that the head tilts with respect to the body by an angle exceeding 60°. Note that the parameters to be monitored are not limited to (Expression 3) and (Expression 4) as long as the parameters are indices capable of qualitatively representing the angles of the vectors in the front direction of the HMD 100 and the arm model and the angle difference therebetween in the roll direction.

The body part position determination section 318 follows the policies of the FA mode and the FT mode to set the arm model to the world coordinate system under the control of the mode control section 314 and then determines the body parts used for the position determination for the input devices 16, that is, the positions J of the elbows at a predetermined cycle. A determination result is successively notified to the position and posture derivation section 244 and is used for the position derivation for the input devices as described with reference to FIG. 14. Note that it is understood by a person skilled in the art that the type of the skeleton model to be used and the body parts the positions of which are obtained can variously be replaced, depending on the positions of the body on which the devices being targets of the position derivation are worn.

Figure 17:
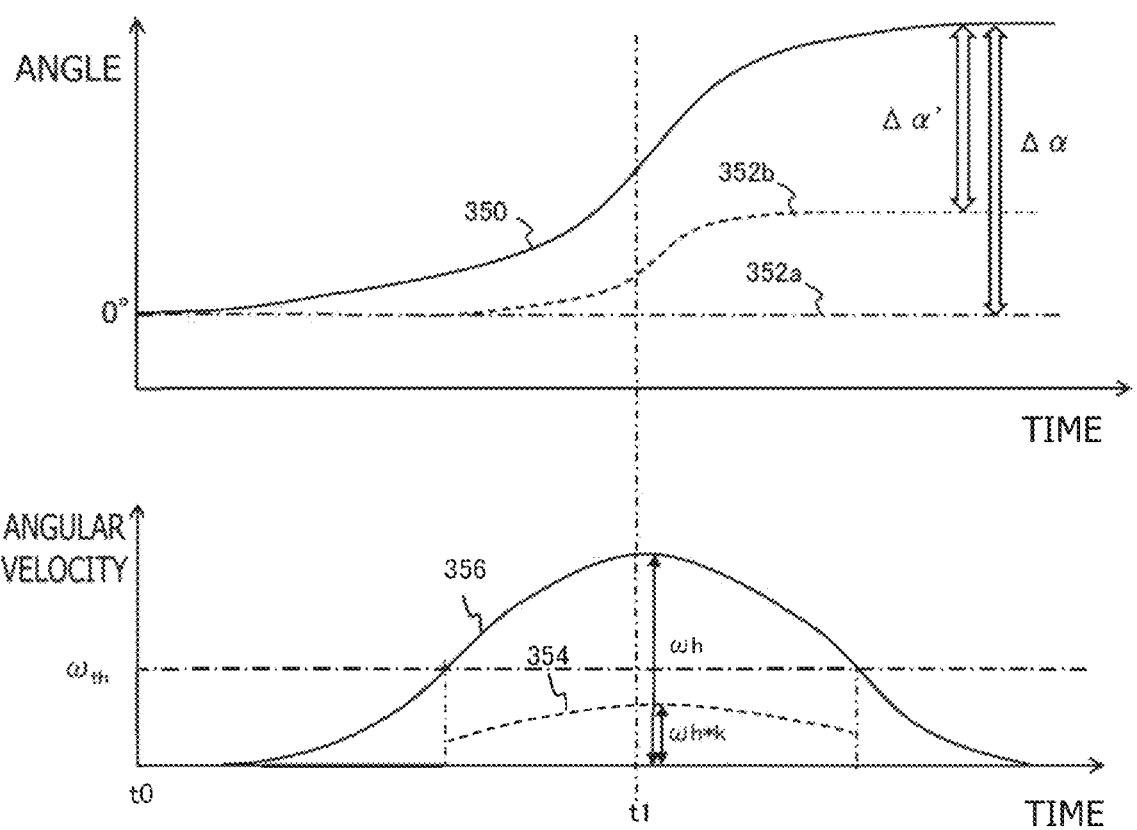
FIG. 17 is a graph for describing processing by a correction section causing a front direction of an arm model to approach a front direction of the HMD in an FT mode of the present embodiment.

FIG. 17 is a graph for describing processing by the correction section 316 causing the front direction of the arm model to approach the front direction of the HMD 100 in the FT mode. An upper row exemplifies temporal changes in the angles (yaw angles) of the vectors in the front direction of the HMD 100 and the arm model. In this example, as a result of the gradual rotation of the HMD 100 from the standard state (0°), an angle 350 of the HMD 100 represented as a solid line monotonically increases. The arm model is principally caused not to follow this rotation in the FT mode, and an angle 352a of the arm model theoretically takes a constant value as represented as a one-dot chain line. As a result, the angle difference between the vectors in the front direction of the HMD 100 and the arm model is $\Delta\alpha$.

Meanwhile, as described before, the correction section 316 rotates the arm model at the predetermined ratio in the same direction as that of the HMD 100 such that the angle difference between the HMD 100 and the arm model does not easily increase. For example, the correction section 316 rotates the arm model so as to achieve a change in the angle 352b as represented as a broken line of the graph. As a result, the angle difference between the vectors in the front direction of the HMD 100 and the arm model is reduced to $\Delta\alpha'$ ($<\Delta\alpha$). In this situation, the correction section 316 changes the correction speed (angular velocity for the correction) according to the angular velocity of the HMD 100. The HMD 100 qualitatively sets a high correction speed of the arm model when the angular velocity of the HMD 100 is high.

A lower row of the graph represents changes in the angular velocity which bring about the changes in the angle illustrated on the upper row. In this example, an angular velocity 356 of the HMD 100 changes such that the angular velocity 356 gradually increases from a time to, takes a maximal value at a time t1 on a middle stage, and then gradually decreases. Meanwhile, the correction section 316 rotates the arm model in the same direction at an angular velocity $\omega h^*k$ obtained by multiplying an angular velocity $\omega h$ of the HMD 100 by a predetermined ratio k ($0<k<1.0$) as illustrated as an angular velocity 354 of the arm model.

Moreover, the correction section 316 may rotate the arm model at the angular velocity $\omega h^*k$ in a limited period in which the angular velocity $\omega h$ of the HMD 100 is equal to or higher than a predetermined threshold value $\omega_{th}$ as illustrated. For example, the correction section 316 sets, as the threshold value $\omega_{th}$, an angular velocity which achieves a change of 0.5° in the generation cycle of the frame and rotates, when the HMD 100 is rotating at an angular velocity equal to or higher than the threshold value $\omega_{th}$, the arm model in the same direction at an angular velocity being 2% of this angular velocity.

As described above, also in the FT mode, it is possible, by causing the arm model to follow the rotational motion of the HMD 100 at the predetermined ratio, to reduce such a probability that the angle difference between the HMD 100 and the arm model reaches an unnaturally large state. Moreover, the state of the arm model, consequently, the position information relating to the input devices 16 can be corrected by eliminating the angle difference when the HMD 100 is greatly moving in a situation in which the correction is unlikely noticed by the user.

Figure 18:
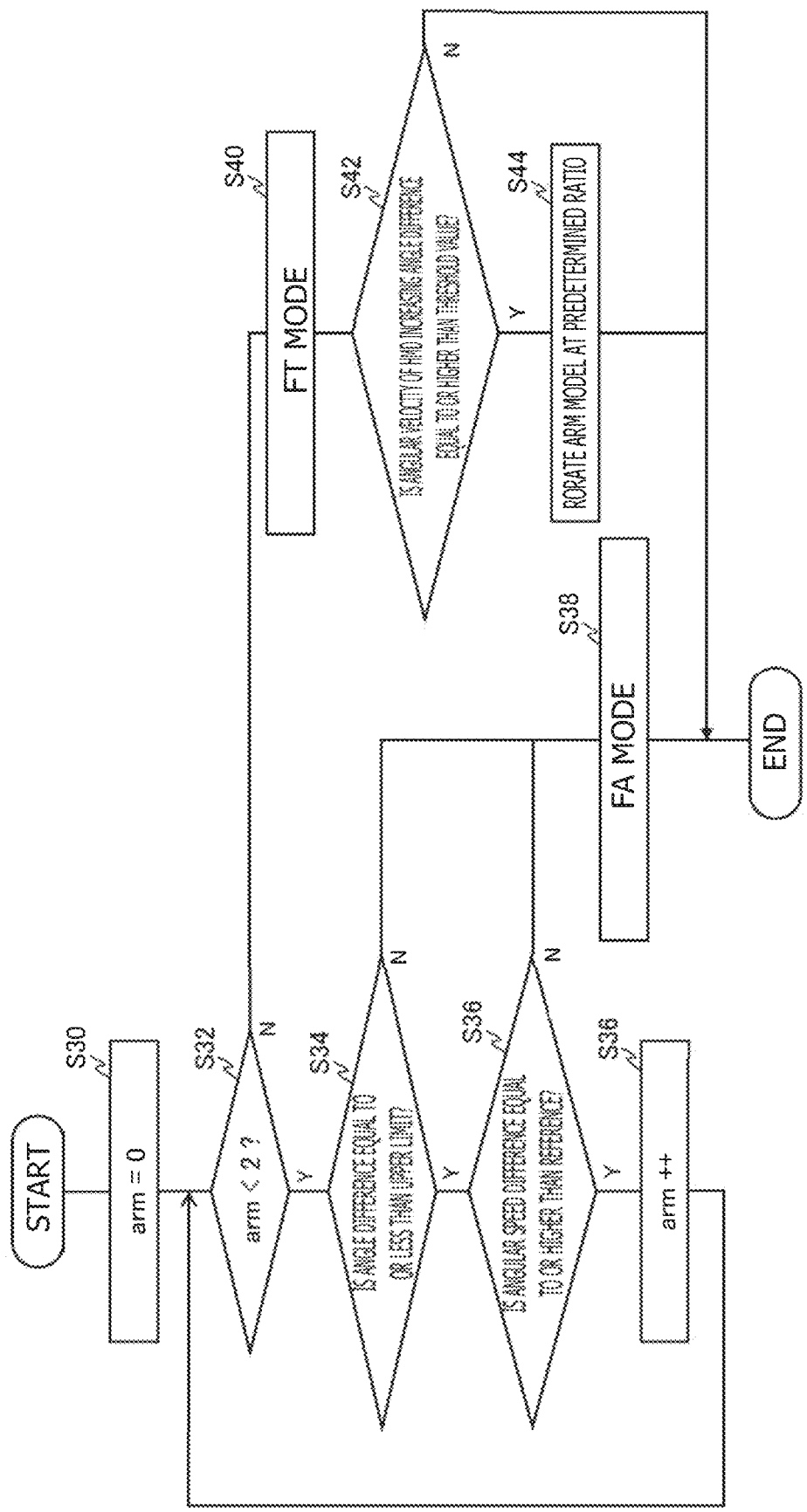
FIG. 18 is a flowchart for illustrating processing steps by the body part position estimation section controlling a set mode of the arm model in the present embodiment.

FIG. 18 is a flowchart for illustrating processing steps by the body part position estimation section 246 controlling the set mode of the arm model in the present embodiment. The body part position estimation section 246 first assigns 0 to a parameter "arm" for identifying the left and right hands (arms), consequently the input devices held by the left and right hands (S30). For example, the body part position estimation section 246 sets the right hand to a target when the parameter "arm" is 0 and sets the left hand to the target when the parameter "arm" is 1.

When the parameter "arm" is less than 2 (Y in S32), the body part position estimation section 246 checks whether or not the angle differences in the front direction and the roll direction between the input device 16 held by the target hand and the HMD 100 are equal to or smaller than the upper limits $\theta_f$ and $\theta_r$ set in advance, that is, satisfy Expression 3 and Expression 4 described above, respectively (S34). When either one of the angle differences is larger than the upper limit (N in S34), the body part position estimation section 246 sets the mode to the FA mode and causes the arm model to follow also the rotational motion of the HMD 100 (S38).

When the angle difference is equal to or smaller than the upper limit (Y in S34), the body part position estimation section 246 then checks whether or not the angular velocity difference between the input device 16 held by the target hand and the HMD 100 is smaller than the reference, that is, whether or not the angular velocity difference satisfies Expression 2 described above (S36). When the angular velocity difference is smaller than the reference (N in S36), the body part position estimation section 246 sets the mode to the FA mode and causes the arm model to follow also the rotational motion of the HMD 100 (S38).

When, for the input device 16 held by the target hand, the angle difference from the HMD 100 is equal to or smaller than the upper limit (Y in S34) and the angular velocity difference is equal to or larger than the reference (Y in S36), the body part position estimation section 246 increments the parameter "arm" and executes the same determination processing for the input device 16 held by the other hand as the target (S36, Y in S32, S34, and S36). When the angle difference from the HMD 100 is equal to or smaller than the upper limit (Y in S34) and the angular velocity difference is equal to or larger than the reference (Y in S36) also for the input device 16 held by the other hand, the body part position estimation section 246 sets the mode to the FT mode and does not cause the arm model to follow the rotational motion of the HMD 100 (N in S32 and S40).

In the FT mode, the body part position estimation section 246 checks whether or not the HMD 100 is rotated in a direction of increasing the angle difference from the arm model (or at least any one of the input devices 16) and the angular velocity $\omega h$ thereof is equal to or higher than the threshold value $\omega_{th}$ (S42). When the angular velocity $\omega h$ is equal to or higher than the threshold value $\omega_{th}$ (Y in S42), the body part position estimation section 246 rotates the arm model so as to follow the HMD 100 at the angular velocity $\omega h*k$ obtained by multiplying this angular velocity $\omega h$ by the predetermined ratio k (S44). When the angular velocity $\omega h$ is lower than the threshold value in the rotation of the HMD 100 of increasing the angle difference (N in S42), the body part position estimation section 246 does not rotate the arm model.

The body part position estimation section 246 repeats the illustrated processing at a predetermined cycle such as the frame cycle of the display image. As a result, it is possible to finely switch whether or not the arm model is caused to follow the rotation of the HMD 100 or the degree thereof according to the change in the motion of the user.

According to the present embodiment described above, the positional relation between the HMD (first device) and the body part such as the hand holding the input device (second device) is set by using the skeleton model of the human, thereby deriving the information relating to the position and the posture of the second device. On this occasion, the case in which the head and the body integrally move and the case in which only the head is rotated are assumed and the setting mode for the skeleton model is switched according to the predetermined determination criterion through use of the sensor data.

Specifically, when the difference in the angular velocity between the HMD and the input device is smaller than the reference, the skeleton model is caused to follow both of the translational motion and the rotational motion of the HMD and when the difference in the angular velocity is equal to or larger than the reference, the skeleton model is caused to follow only the translational motion of the HMD. As a result, the skeleton model can be set in consideration of the actual motion characteristics such as quickly looking back, inclining the head, and changing the posture of the entire body, and the positions of the body parts and, consequently, the accuracy of the information relating to the positions and the postures of the input devices can be increased. Moreover, in the system which tracks the input devices on the basis of the captured images, even when the input device deviates from the image angle of the imaging apparatus, the tracking can be continued, and the accuracy of the information processing through use of the position and posture information can also be increased.

Further, on the basis of the fact that the face and the body orient toward the same direction in the standard state, the correction processing of filtering the tendency of deviating from this standard state is continuously applied to the skeleton model also in the mode in which the skeleton model is not caused to follow the rotational motion of the HMD 100. As a result, it is possible to achieve a low possibility of the skeleton model reaching the unnatural state due to the error in the sensor data and the like, thereby being able to maintain the acquisition accuracy of the position and posture information relating to the input devices.

The present disclosure has been described on the basis of the embodiment. The present embodiment is illustrative, and it is to be understood by a person skilled in the art that changes and variations may be made in the combinations of the components and the processing processes thereof and these changes and variations are also within the scope of the present disclosure. In the present embodiment, the acquisition of the position and the posture of the device is executed by the information processing apparatus 10, but this function of the information processing apparatus 10 may be provided in the HMD 100 and the HMD 100 may execute the information acquisition. That is, the HMD 100 may be the information processing apparatus 10.

In the present embodiment, the arrangement of the plurality of markers 30 in the input devices 16 including the operation members 22 is described, but the devices being the targets of the tracking are not always required to include the operation members 22. In the present embodiment, the imaging apparatus 14 are attached to the HMD 100, but it is sufficient if the imaging apparatus 14 may be able to capture the marker images and may be attached to positions other than the HMD 100.

What is claimed is:

1. An information processing apparatus comprising:
processing circuitry configured to:
acquire position and posture information relating to a first device worn on a user;
acquire position information relating to a second device worn on a portion different from the first device based on the position and posture information relating to the first device and a skeleton model of a human;
acquire sensor data from a sensor that measures motions of the first device and the second device; and
change a degree of following of the skeleton model to the first device based on the sensor data.

2. The information processing apparatus according to claim 1, wherein the processing circuitry is further configured to
set the degree of following to be low when a difference in angular velocity between the first device and the second device exceeds a predetermined reference.

3. The information processing apparatus according to claim 1, wherein the processing circuitry is further configured to
determine whether or not the skeleton model is caused to follow a rotational motion of the first device as the change in the degree of following.

4. The information processing apparatus according to claim 3, wherein the processing circuitry is further configured to
rotate the skeleton model in a same direction as a rotation direction of the first device under a predetermined condition also in a mode in which the skeleton model is not caused to follow the rotational motion of the first device.

5. The information processing apparatus according to claim 4, wherein the processing circuitry is further configured to
rotate the skeleton model at an angular velocity obtained by multiplying an angular velocity of the first device by a predetermined ratio k (0<k<1.0) in a period in which an angle difference in a front direction between the first device and the skeleton model is in an increase direction and this angular velocity is equal to or higher than a predetermined threshold value.

6. The information processing apparatus according to claim 3, wherein the processing circuitry is further configured to switch a mode in which the skeleton model is not caused to follow the rotational motion of the first device to a mode in which the skeleton model is caused to follow the rotational motion of the first device, when an angle difference in a front direction between the first device and the skeleton model is larger than a predetermined upper limit.

7. The information processing apparatus according to claim 1, wherein the processing circuitry is further configured to acquire position and posture information relating to a head-mounted display serving as the first device, and acquire a position of a device held by the user as the second device.

8. The information processing apparatus according to claim 7, wherein the processing circuitry is further configured to set the degree of following to be low under such a condition that a difference between each of angular velocities of both of two devices that are held by left and right hands of the user as the second device and an angular velocity of the first device exceeds a predetermined reference.

9. The information processing apparatus according to claim 1, wherein the first device includes an imaging apparatus, and wherein the processing circuitry is further configured to acquire the position information relating to the second device based on a captured image by the imaging apparatus in a case that the second device is within a view field of the imaging apparatus, and acquire the position information relating to the second device based on the skeleton model in a case that the second device is outside the view field of the imaging apparatus.

10. The information processing apparatus according to claim 9, wherein the processing circuitry is further configured to acquire the position and posture information relating to the first device through simultaneous localization and mapping processing based on the captured image by the imaging apparatus.

11. A device position acquisition method comprising:
acquiring position and posture information relating to a first device worn on a user;
acquiring position information relating to a second device worn on a portion of the user different from the first device on a basis of the position and posture information relating to the first device and a skeleton model of a human;
acquiring sensor data from a sensor that measures motions of the first device and the second device; and
changing a degree of following of the skeleton model to the first device based on the sensor data.

12. A non-transitory computer-readable storage medium storing computer-readable instructions thereon which, when executed by a computer, cause the computer to perform a method, the method comprising:
acquiring position and posture information relating to a first device worn on a user;
acquiring position information relating to a second device worn on a portion of the user different from the first device based on the position and posture information relating to the first device and a skeleton model of a human;
acquiring sensor data from a sensor that measures motions of the first device and the second device; and
changing a degree of following of the skeleton model to the first device based on the sensor data.

13. The non-transitory computer-readable storage medium of claim 12, further comprising:
setting the degree of following to be low when a difference in angular velocity between the first device and the second device exceeds a predetermined reference.

14. The non-transitory computer-readable storage medium of claim 12, further comprising:
determining whether or not the skeleton model is caused to follow a rotational motion of the first device as the change in the degree of following.

15. The non-transitory computer-readable storage medium of claim 14, further comprising:
rotating the skeleton model in a same direction as a rotation direction of the first device under a predetermined condition also in a mode in which the skeleton model is not caused to follow the rotational motion of the first device.

16. The non-transitory computer-readable storage medium of claim 15, further comprising:
rotating the skeleton model at an angular velocity obtained by multiplying an angular velocity of the first device by a predetermined ratio k (0<k<1.0) in a period in which an angle difference in a front direction between the first device and the skeleton model is in an increase direction and this angular velocity is equal to or higher than a predetermined threshold value.

17. The non-transitory computer-readable storage medium of claim 14, further comprising:
switching a mode in which the skeleton model is not caused to follow the rotational motion of the first device to a mode in which the skeleton model is caused to follow the rotational motion of the first device, when an angle difference in a front direction between the first device and the skeleton model is larger than a predetermined upper limit.

18. The non-transitory computer-readable storage medium of claim 12, further comprising:
acquiring position and posture information relating to a head-mounted display serving as the first device; and
acquiring a position of a device held by the user as the second device.

19. The non-transitory computer-readable storage medium of claim 18, further comprising:
setting the degree of following to be low under such a condition that a difference between each of angular velocities of both of two devices that are held by left and right hands of the user as the second device and an angular velocity of the first device exceeds a predetermined reference.

20. The non-transitory computer-readable storage medium of claim 12, further comprising:
acquiring the position information relating to the second device based on an image captured by an imaging apparatus in a case that the second device is within a view field of the imaging apparatus, and acquiring the position information relating to the second device based on the skeleton model in a case that the second device is outside the view field of the imaging apparatus.

\* \* \* \* \*